(12) United States Patent
Suzuki

(10) Patent No.: US 11,081,981 B2
(45) Date of Patent: Aug. 3, 2021

(54) ROTATING MACHINE CONTROLLER

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/688,103

(22) Filed: Nov. 19, 2019

(65) Prior Publication Data

US 2020/0177113 A1 Jun. 4, 2020

(30) Foreign Application Priority Data

Nov. 29, 2018 (JP) .............................. JP2018-223293

(51) Int. Cl.
*H02P 5/60* (2006.01)
*B62D 5/04* (2006.01)

(52) U.S. Cl.
CPC .............. *H02P 5/60* (2013.01); *B62D 5/0463* (2013.01)

(58) Field of Classification Search
CPC ................................ H02P 5/60; B62D 5/0463
USPC ...................................................... 318/3, 4, 5
See application file for complete search history.

(56) References Cited

U.S. PATENT DOCUMENTS

| | | | | |
|---|---|---|---|---|
| 6,242,884 B1* | 6/2001 | Lipo | .......................... | H02P 3/18 318/496 |
| 7,362,597 B2* | 4/2008 | Ishikawa | .................. | B60L 50/61 363/71 |
| 7,439,697 B2* | 10/2008 | Miyazaki | .......... | H02M 7/53875 318/400.41 |
| 8,718,873 B2* | 5/2014 | Kushiro | ................. | B62D 6/008 701/41 |
| 8,901,882 B2* | 12/2014 | Song | ....................... | B60L 53/66 320/109 |
| 2016/0023677 A1 | 1/2016 | Sakurai et al. | | |

FOREIGN PATENT DOCUMENTS

| | | |
|---|---|---|
| EP | 3192709 A1 | 7/2017 |
| JP | 2012-201334 A | 10/2012 |
| JP | 5125055 B2 | 1/2013 |
| JP | 5614576 B2 | 10/2014 |
| JP | 5614588 B2 | 10/2014 |
| JP | 2014-218219 A | 11/2014 |
| JP | 5768998 B2 | 8/2015 |
| JP | 5768999 B2 | 8/2015 |
| JP | 2016-30471 A | 3/2016 |

* cited by examiner

*Primary Examiner* — David Luo
(74) *Attorney, Agent, or Firm* — Maschoff Brennan

(57) ABSTRACT

An electronic control unit, for example, a rotating machine controller, is capable of driving one three-phase motor including a first set of three-phase winding and a second set of three-phase winding and one to three direct current motors. The direct current motor is connected to a position between one phase of the first set of three-phase winding and one phase of the second set of three-phase winding without redundancy. Inverters convert a direct current electric power to a three-phase alternating current electric power by an operation of bridge-connected plural switching elements, and apply a voltage to each phase in two sets of three-phase winding. A control unit controls a supply of electric power to the three-phase motor and to the direct current motor by controlling an operation of the switching elements.

20 Claims, 20 Drawing Sheets

TILT

TELESCOPIC

ROTATING MACHINE CONTROLLER

CROSS REFERENCE TO RELATED APPLICATION

The present application is based on and claims the benefit of priority of Japanese Patent Application No. 2018-223293, filed on Nov. 29, 2018, the disclosure of which is incorporated herein by reference.

TECHNICAL FIELD

The present disclosure generally relates to a rotating machine controller.

BACKGROUND INFORMATION

A rotating machine controller, in the related art, is known to be provided as a device that has one drive circuit to drive a polyphase rotating machine and a direct current (DC) rotating machine.

For example, a motor control device disclosed in the related art drives a three-phase alternating current (AC) motor and two DC motors by one three-phase inverter drive circuit. Specifically, this motor control device is used as a vehicle steering device, and drives a three-phase motor of an electric power steering (EPS) as well as a tilt DC motor and a telescopic DC motor. In such manner, the number of switching elements required to drive each of those motors is reduced.

In the prior art device, after turning ON of the ignition key, the tilt motor and the telescopic motor are operated in parallel to perform a position adjustment operation. Then, at a timing when it is determined that the position adjustment operation is not being performed, the EPS three-phase motor is controlled. That is, only one of the DC motor and the three-phase motor is driven at one time, and simultaneous control of the DC motor and the three-phase motor is not performable. Further, depending on the circuit configuration, it is sometimes impossible to simultaneously control energization of both of the DC motor and the three-phase motor.

SUMMARY

It is an object of the present disclosure to provide a rotating machine controller which is capable of simultaneously controlling supply of electric power to both of a multi-/poly-phase rotating machine and a DC rotating machine.

BRIEF DESCRIPTION OF THE DRAWINGS

Objects, features, and advantages of the present disclosure will become more apparent from the following detailed description made with reference to the accompanying drawings, in which:

FIG. 19 is a flowchart of an operation immediately after a vehicle switch ON.

DETAILED DESCRIPTION

Hereinafter, a plurality of embodiments of a rotating machine controller are described based on the drawings. The rotating machine controller according to each embodiment is applied to an electric power steering system (hereinafter, "EPS system") or a steer-by-wire system (hereinafter, "SBW system") of a vehicle, and functions as an EPS-ECU or SBW-ECU. In the following embodiments, the EPS-ECU and the SBW-ECU may collectively be referred to as "ECU." In addition, the first and second embodiments may collectively be referred to as "the present embodiment." The first embodiment and the second embodiment differ only in the connection configuration of a direct current (DC) power source.

[System Configuration]

Figure 1:
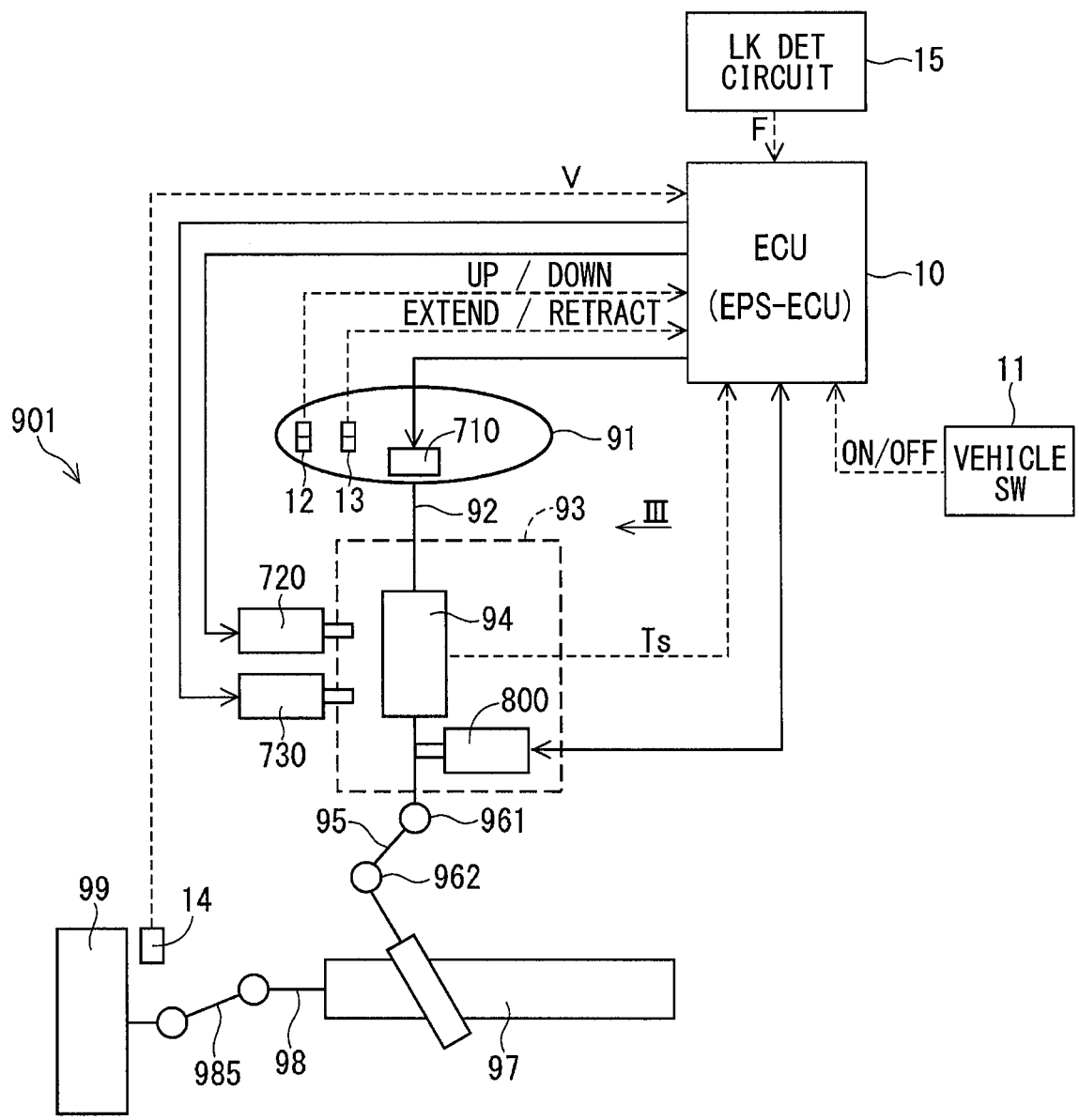
FIG. 1 is a diagram of an electric power steering (EPS) system to which an electric control unit (ECU), for example, a rotating machine controller of the present embodiment is applied.
Figure 2:
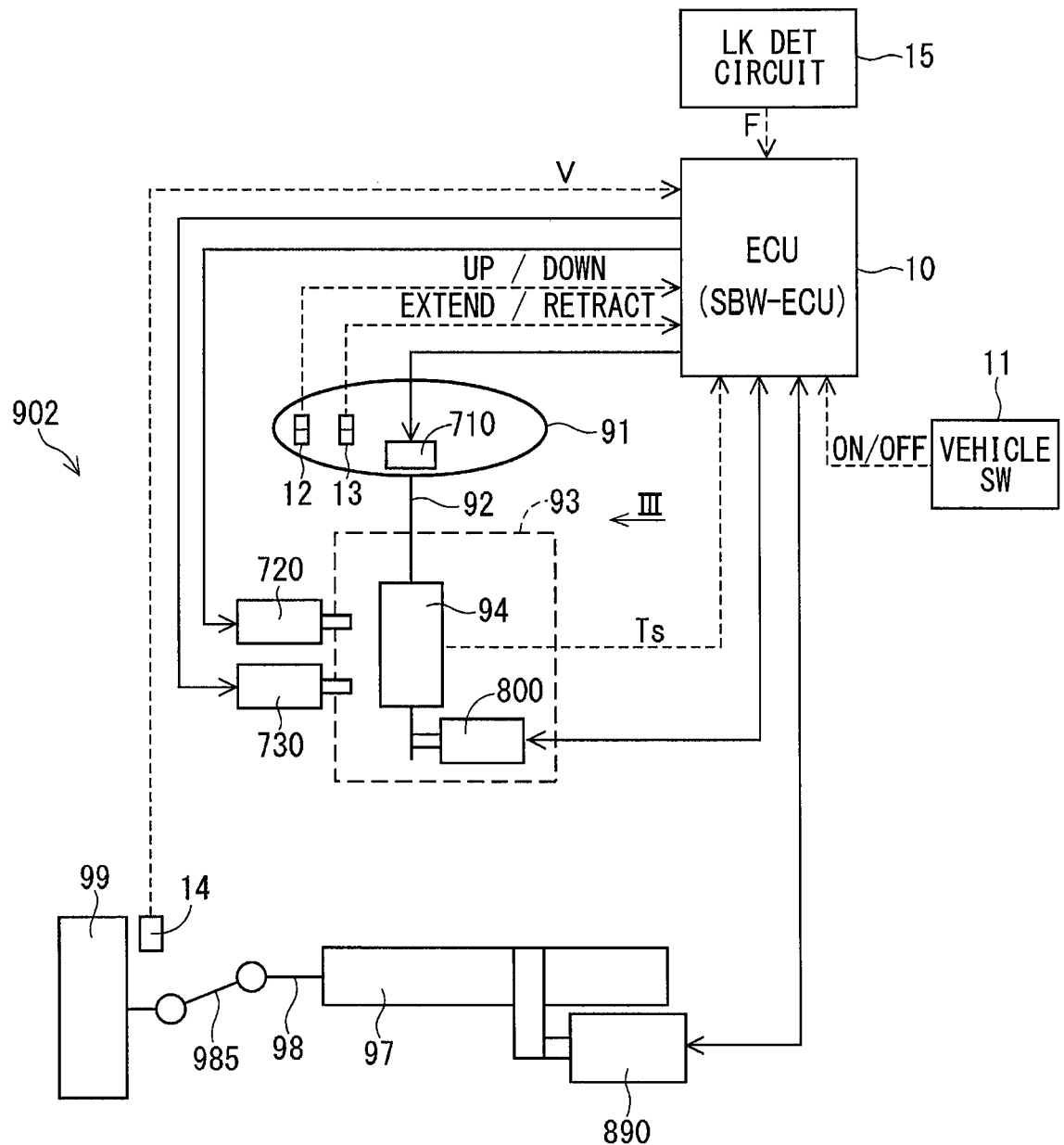
FIG. 2 is a diagram of a steer-by-wire (SBW) system to which the ECU of the present embodiment is applied.

First, a system configuration in the present embodiment to which an ECU as a "rotating machine controller" is applied is described with reference to FIGS. 1 to 3. FIG. 1 shows an EPS system 901 in which a steering mechanism, such as a steering wheel side mechanism, and a tire turning mechanism, such as a rack-&-pinion side mechanism, are mechanically connected. FIG. 2 shows an SBW system 902 in which the steering mechanism and the tire turning mechanism are mechanically separated. In FIGS. 1 and 2, only one of two tires 99 is illustrated, and the illustration of the opposite side tire is omitted.

As shown in FIG. 1, the EPS system 901 includes a steering wheel 91, a steering shaft 92, an intermediate shaft 95, a rack 97, and the like. The steering shaft 92 is accommodated in a steering column 93, to which the steering wheel 91 is connected on one end, and the intermediate shaft 95 is connected on the other end.

At an opposite end of the intermediate shaft 95 opposite to an end close to the steering wheel 91, a rack 97 is provided for converting rotation into reciprocal motion by a rack and pinion mechanism and for transmitting the converted motion. When the rack 97 reciprocates, the tire 99 is steered via a tie rod 98 and a knuckle arm 985. Further, universal joints 961 and 962 are provided in the middle of the intermediate shaft 95. The universal joints 961, 962 absorb the displacement of the steering column 93 due to the tilt operation and the telescopic operation.

A torque sensor 94 is provided in the middle of the steering shaft 92, and detects a steering torque Ts of a driver based on a torsional displacement of a torsion bar. In the EPS system, an ECU 10 controls the drive of a three-phase motor 800 based on the steering torque Ts detected by the torque sensor 94 and a vehicle speed V detected by a vehicle speed sensor 14, and outputs a desired steering assist torque therefrom. Thus, in the EPS system 901, a rotating machine for outputting a steering assist torque is used as a "polyphase rotating machine." Each of the signals sent to the ECU 10 may be communicated using CAN, serial communication, or the like, or may be sent as an analog voltage signal.

In the present embodiment, three DC motors 710, 720, 730 are provided as "DC rotating machines." A steering lock actuator 710 is provided at a proximity of the steering wheel 91, and locks the steering wheel 91 so as not to rotate when parked or the like. The ECU 10 instructs the steering lock actuator 710 to release or re-lock a steering lock based on an ON/OFF signal of a vehicle switch 11. The vehicle switch 11 corresponds to an ignition switch in an engine vehicle, or corresponds to a push switch in a hybrid vehicle or an electric vehicle.

Further, in the present embodiment, a lane keep flag F is input from a lane keep determination circuit 15 to the ECU 10. If the lane keep determination circuit 15 determines that the vehicle has deviated from a lane or is likely to deviate therefrom, the lane keep flag F is generated. When the lane keep flag F is input, the ECU 10 vibrates the steering wheel 91 to alert the driver.

In the present embodiment, for the ease of understanding, the steering lock actuator 710 is assumed to function as a steering wheel vibration actuator that vibrates the steering wheel 91 to alert the driver. The steering lock actuator is described, for example, in JP 2017-124794 A, and the steering wheel vibration actuator is described, for example, in JP 2016-30471 A.

Figure 3A:
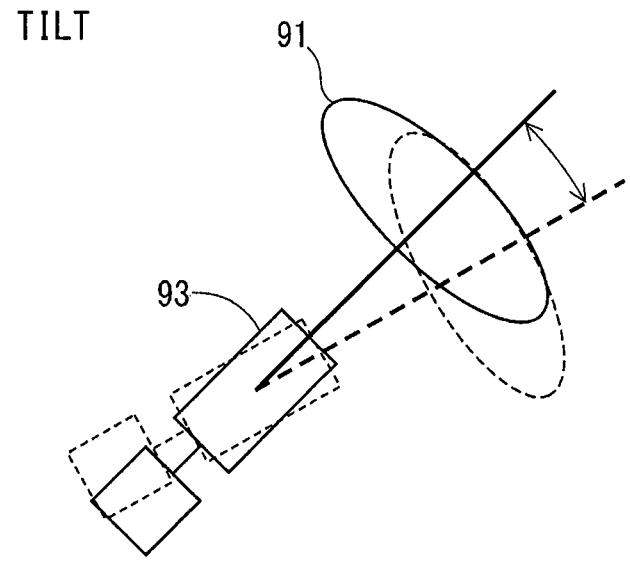
FIG. 3A is an illustration of a tilt operation.

A tilt actuator 720 and a telescopic actuator 730 are provided on the steering column 93. When the driver operates a tilt switch 12 to input an instruction of "up/down" to the ECU 10, the ECU 10 instructs the tilt actuator 720 to perform a tilt operation. Then, as shown in FIG. 3A, the tilt actuator 720 adjusts a tilt angle to move the steering wheel 91 up and down. When the vehicle switch 11 is turned ON to start the vehicle, the steering wheel moves up/down to a preset drive position, and when the vehicle switch 11 is turned OFF and the vehicle stops, the steering wheel also moves to widen a driver's space around the steering wheel.

Figure 3B:
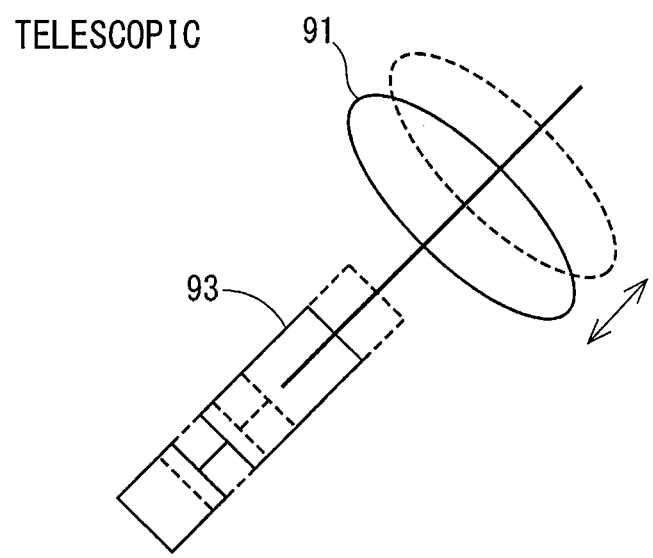
FIG. 3B is an illustration of a telescopic operation.

In addition, when the driver operates a telescopic switch 13 to input an "extend/retract" instruction to the ECU 10, the ECU 10 instructs the telescopic actuator 730 to perform a telescopic operation. Then, as shown in FIG. 3B, the telescopic actuator 730 adjusts a telescopic length to move the steering wheel 91 back and forth. When the vehicle switch 11 is turned ON to start the vehicle, the steering wheel moves up/down to a preset drive position, and when the vehicle switch 11 is turned OFF and the vehicle stops, the steering wheel also moves to widen a driver's space around the steering wheel.

Subsequently, as shown in FIG. 2, in the SBW system 902 in which the steering mechanism and the tire turning mechanism are mechanically separated, there is no intermediate shaft 95 provided in the EPS system 901. The steering torque Ts of the driver is electrically transmitted to a steering motor 890 via the ECU 10. The rotation of the steering motor 890 is converted to the reciprocal motion of the rack 97, and the tire 99 is steered via the tie rod 98 and the knuckle arm 985. Although not shown in FIG. 2, there is a steering motor ECU that drives the steering motor 890 in response to an input of the driver from the steering wheel.

Also, in the SBW system 902, the driver can not directly sense a reaction force for steering. Thus, the ECU 10 controls the drive of the three-phase motor 800, rotates the steering wheel 91 so as to apply a reaction force to the steering wheel 91, and gives the driver an appropriate steering feedback. Thus, in the SBW system 902, a rotating machine for outputting a reaction torque is used as a "polyphase rotating machine."

In the SBW system 902 of FIG. 2, three DC motors as "DC rotating machines," that is, the steering lock actuator 710, the tilt actuator 720 and the telescopic actuator 730 are used in the same manner as the EPS system 901 of FIG. 1.

Hereinafter, in the description of control of the three-phase motor 800 and the DC motors 710, 720, 730 by the ECU 10, there is no difference between the EPS system 901 and the SBW system 902. Here, the three-phase motor 800 of the present embodiment is configured as a "machine-controller integrated motor" in which the ECU 10 is integrally formed on one side in the axial direction of the motor 800. On the other hand, the direct current motors 710, 720, and 730 are connected to the ECU 10 via connectors.

Figure 4:
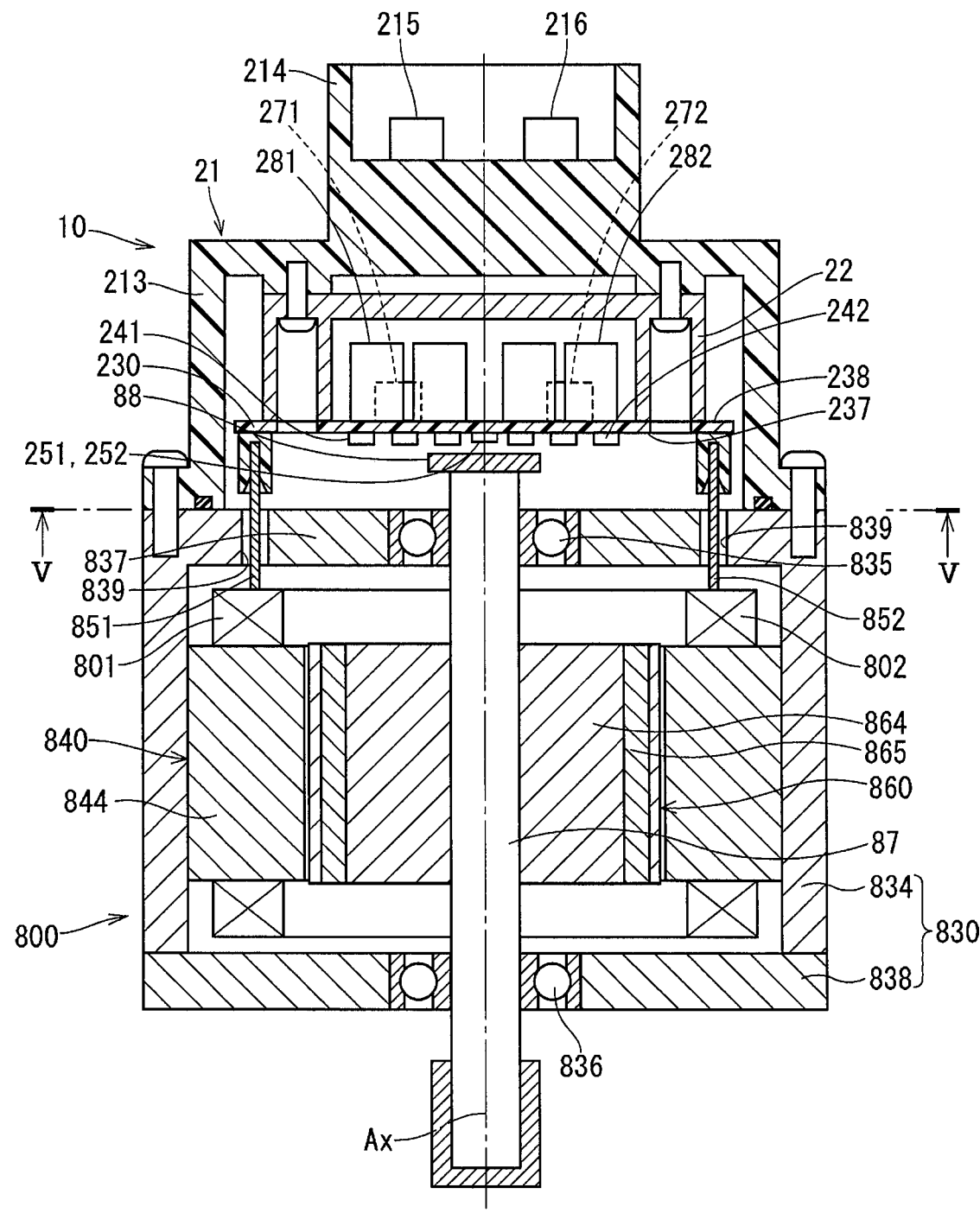
FIG. 4 is an axial sectional view of a two-system machine-controller integrated motor.
Figure 5:
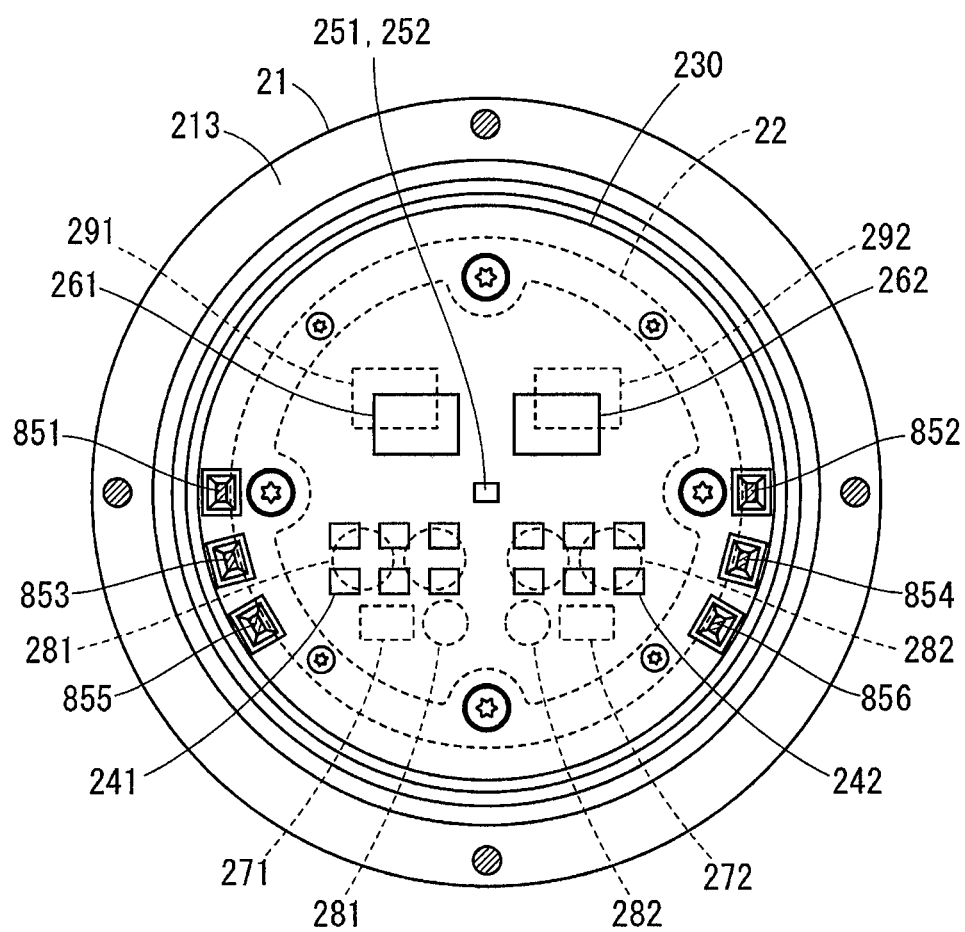
FIG. 5 is a cross-sectional view along a V-V line of FIG. 4.

Next, with reference to FIGS. 4 and 5, an example of the configuration of the machine-controller integrated motor is described. In the example shown in FIG. 4, the ECU 10 is disposed coaxially with an axis Ax of a shaft 87 on one side opposite to an output side of the three-phase motor 800. In another embodiment, the ECU 10 may be integrated with the three-phase motor 800 on the output side of the three-phase motor 800. The three-phase motor 800 is a brushless motor, and includes a stator 840, a rotor 860, and a housing 830 for accommodating the stator 840 and the rotor 860.

The stator 840 includes a stator core 844 fixed to the housing 830, and two sets of three-phase winding 801 and 802 assembled to the stator core 844. Lead wires 851, 853, 855 extend from each of phase winding wires constituting the first set of three-phase winding 801. Lead wires 852, 854, 856 extend from each of phase winding wires constituting the second set of three-phase winding 802. Each phase winding wire is wound in each slot 848 of the stator core 844.

Hereinafter, combinations of the two sets three-phase winding 801 and 802 and the corresponding inverter with other configurations may hereafter be referred to as a "system" respectively. In the present embodiment, the ECU 10 has two systems in configuration. In the configuration of a first system, "1" is suffixed as the third digit of the serial number, and in the configuration of a second system, "2" is suffixed as the third digit of the serial number.

The rotor 860 has a shaft 87 supported by a rear bearing 835 and a front bearing 836, and a rotor core 864 into which the shaft 87 is fitted. The rotor 860 is provided inside the stator 840 and is rotatable relative to the stator 840. At one end of the shaft 87, a permanent magnet 88 for detecting a rotation angle is provided.

The housing 830 has a bottomed cylindrical case 834 including a rear frame end 837, and a front frame end 838 provided at one end of the case 834. The case 834 and the front frame end 838 are fastened to each other by bolts or the like. The lead wires 851, 852 and the like of the first/second sets of three-phase winding 801 and 802 are inserted and extend through lead wire insertion holes 839 of the rear frame end 837 toward the ECU 10, and are connected to a substrate 230.

Figure 8:
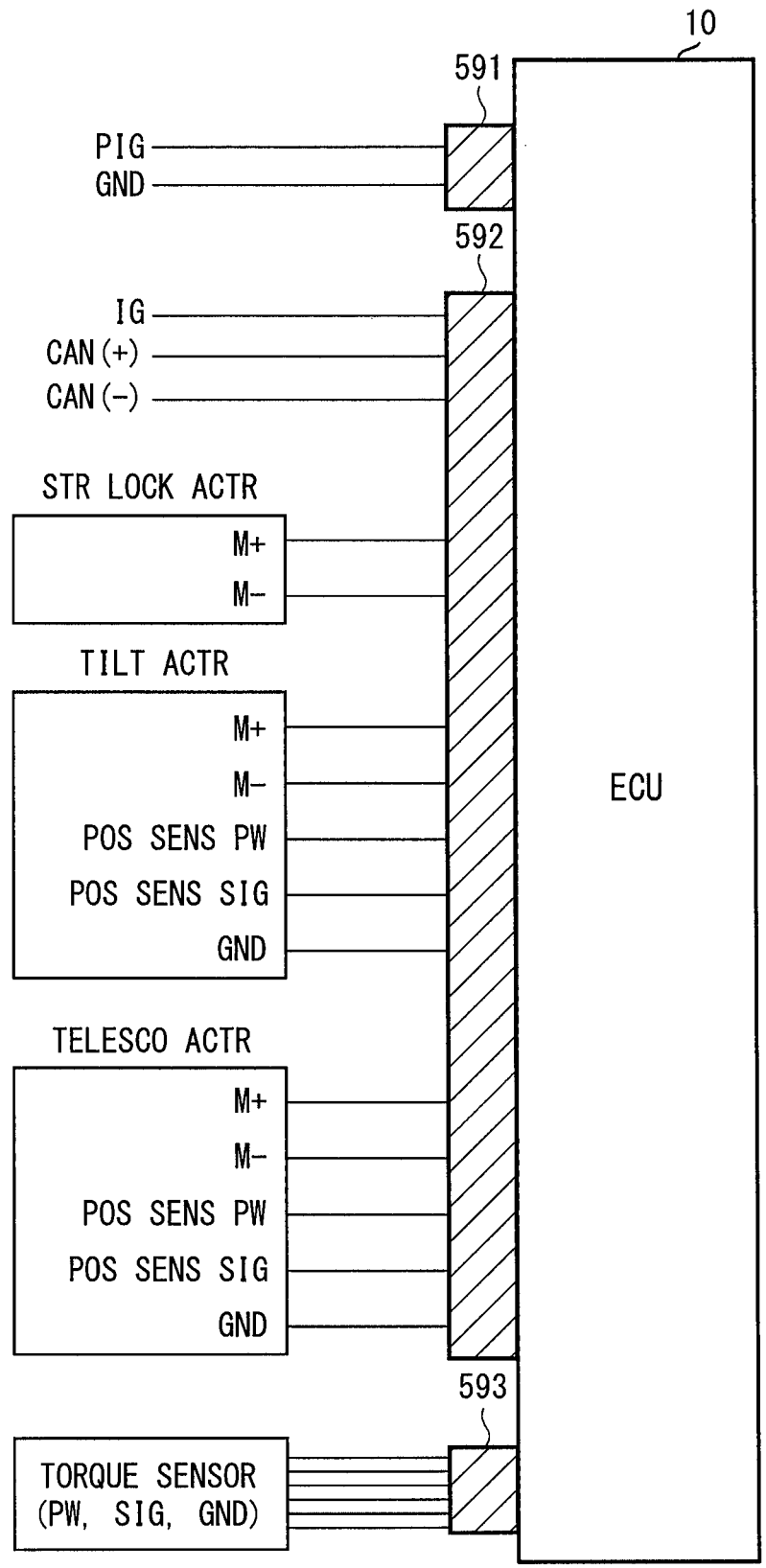
FIG. 8 is an illustration of a connection configuration of a connector.

The ECU 10 includes a cover 21, a heat sink 22 fixed to the cover 21, the substrate 230 fixed to the heat sink 22, and various electronic components mounted on the substrate 230. The cover 21 protects the electronic component from external impact, and prevents intrusion of dust, water, and the like into the ECU 10. The cover 21 includes a cover part 213 and a connector part 214 for external connection, to which a feeder cable and/or a signal cable from outside is connected. Power supply terminals 215 and 216 of the connector part 214 are connected to the substrate 230 via a path that is not illustrated. In FIG. 8, other reference numerals are given to the connector part 214.

The substrate 230 is, for example, a printed circuit board, provided at a position facing the rear frame end 837, and fixed to the heat sink 22. On the substrate 230, electronic components for two systems are provided independently for each system. In the present embodiment, one substrate 230 is provided, but two or more substrates may be provided in other embodiments. Of two main surfaces of the substrate 230, one surface facing the rear frame end 837 is designated as a motor surface 237, and an opposite surface facing the heat sink 22, is designated as a cover surface 238.

Figure 7:
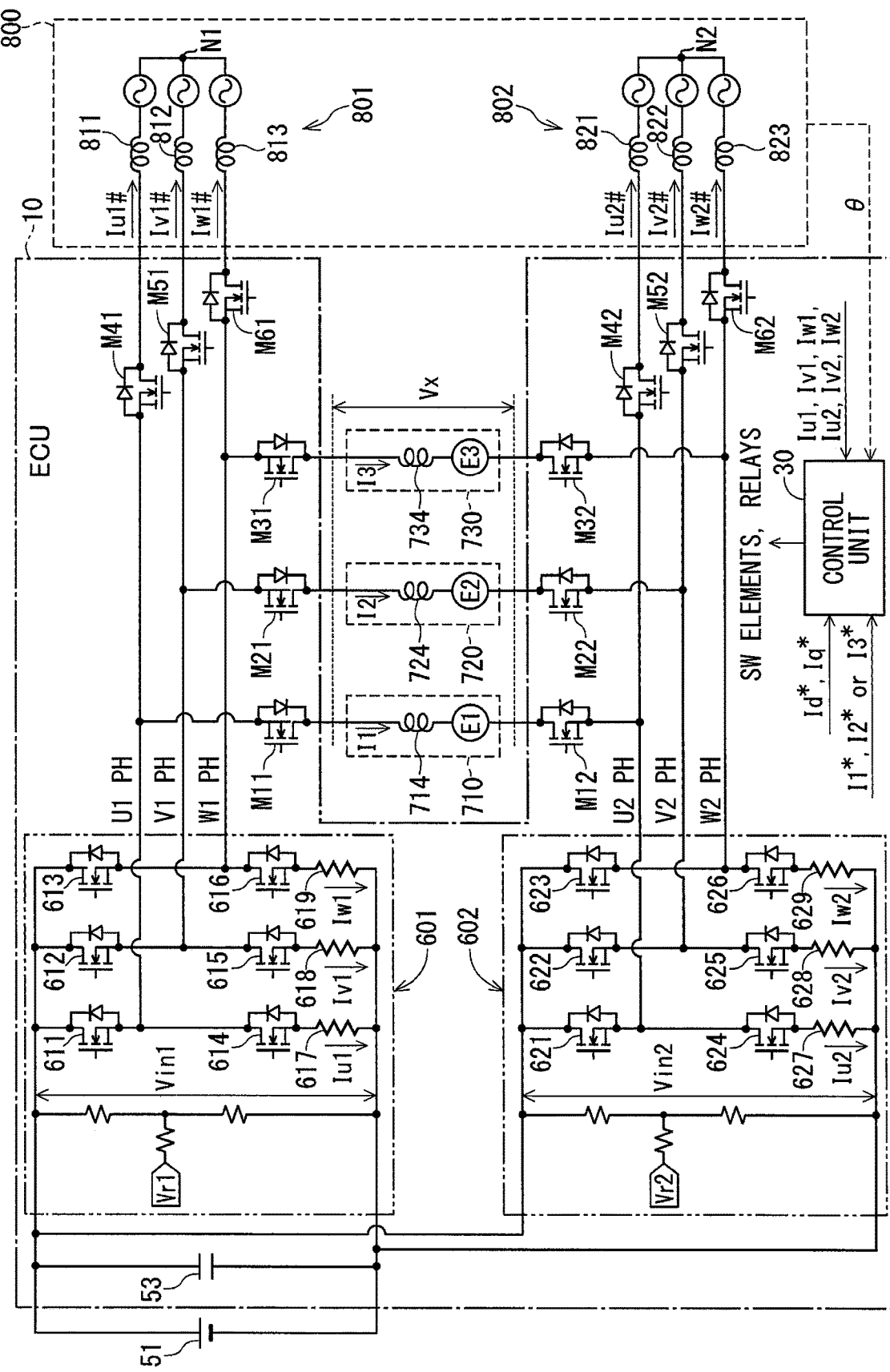
FIG. 7 is a circuit configuration diagram of the ECU according to a first embodiment of the present disclosure.

On the motor surface 237, a plurality of switching elements 241 and 242, rotation angle sensors 251 and 252, custom ICs 261 and 262, and the like are mounted. In the present embodiment, the plurality of switching elements 241 and 242 constitute three-phase upper and lower arms of each system. In FIG. 7, other reference numerals are given to the plurality of switching elements 241, 242. The rotation angle sensors 251, 252 are disposed to face the permanent magnet 88 that is provided at the tip of the shaft 87. The custom ICs 261 and 262 and the microcomputers 291 and 292 respectively have a control circuit of the ECU 10. In the example of FIGS. 4 and 5, although two rotation angle sensors 251, 252 and two microcomputers 291, 292, etc. are provided for each system, the two systems may share one rotation angle sensor and/or one microcomputer.

On the cover surface 238, the microcomputers 291, 292, capacitors 281, 282, inductors 271, 272, and the like are mounted. In particular, the first microcomputer 291 and the second microcomputer 292 are arranged at predetermined intervals on one surface of the single substrate 230. The capacitors 281 and 282 smooth electric power input from the power source, and prevent an outflow of noise caused by the switching operation of the switching elements 241 and 242. The inductors 271 and 272 form a filter circuit together with the capacitors 281 and 282.

Figure 6:
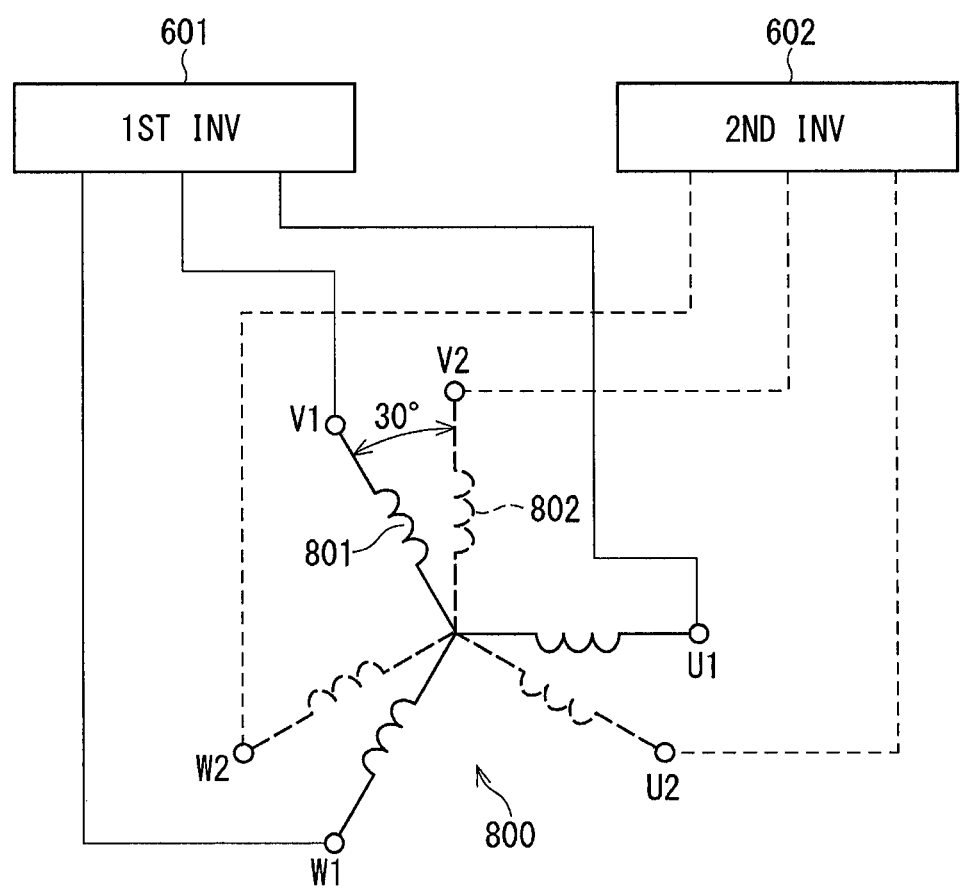
FIG. 6 is an illustration of phase difference between two sets of three-phase winding.

As shown in FIG. 6, two sets of three-phase winding 801 and 802 of the three-phase motor 800 are provided coaxially. The two sets of three-phase winding 801 and 802 have the same electrical characteristics, and are disposed on the same stator 840 with an electric angle of 30 [deg] offset from each other. Here, when an angle equivalent to 30 [deg] is generalized, it may be represented as (30±60×k) [deg] (k is an integer).

[ECU Configuration]

First Embodiment

FIG. 7 shows a configuration of the ECU 10 in its entirety, according to a first embodiment of the present disclosure. The first set of three-phase winding 801 of the three-phase motor 800, the U1-phase, V1-phase, and W1-phase winding wires 811, 812, 813, is configured to be connected at a neutral point N1. The second set of three-phase winding 802, the U2-phase, V2-phase, and W2-phase winding wires 821, 822 and 823, is configured to be connected at a neutral point N2. In each phase of the three-phase motor 800, a counter electromotive voltage is generated in proportion to the product of the rotation speed and the sin value of the phase. An electric angle θ of the three-phase motor 800 is detected by a rotation angle sensor.

The three DC motors 710, 720, 730 are connected at positions between the respective phases of the first set of three-phase winding 801 and the respective phases of the second set of three-phase winding 802 without overlapping, for example, one motor to each of U, V, W phases. A winding wire 714 of the steering lock actuator 710 is connected to a position between the U1 phase of the first set of three-phase winding 801 and the U2 phase of the second set of three-phase winding 802. A winding wire 724 of the tilt actuator 720 is connected to a position between the V1 phase of the first set of three-phase winding 801 and the V2 phase of the second set of three-phase winding 802. A winding wire 734 of the telescopic actuator 730 is connected to a position between the W1 phase of the first set of three-phase winding 801 and the W2 phase of the second set of three-phase winding 802.

When energizing the three-phase motor 800, the ECU 10 can simultaneously energize one of the three DC motors 710, 720, 730 selected as a target of current supply. At such time of energization, DC currents supplied to the DC motors 710, 720, 730 selected as the specific DC motors are designated as I1, I2, I3. The direct current motors 710, 720, 730 rotate forward or backward depending on whether the direct currents I1, I2, I3 are positive or negative. Further, when the specific DC motor is energized, a counter electromotive voltage is generated in proportion to the rotation speed. The counter electromotive voltages generated in the respective DC motors 710, 720, 730 are designated as E1, E2, E3.

The ECU 10 includes inverters 601 and 602 as the "two sets of polyphase power converters" and a control unit 30. The first inverter 601 and the second inverter 602 convert the DC power of a DC power source 51 into three-phase AC power by the operation of the plurality of bridge-connected switching elements 611-616 and 621-626 on a high potential side and a low potential side. The plurality of switching elements 611 to 616 and 621 to 626 are, for example, MOSFETs, and operate according to the drive signal from the control unit 30. In FIG. 7, the illustration of the signal lines from the control unit 30 to the switching elements 611 to 616 and 621 to 626 is omitted.

Specifically, the switching elements 611, 612 and 613 of the first inverter 601 are upper arm elements provided on the high potential side of the U1, V1 and W1 phases, respectively, and the switching elements 614, 615 and 616 of the first inverter 601 are lower arm elements provided on the low potential side of the U1, V1, and W1 phases, respectively. The switching elements 621, 622, and 623 of the second inverter 602 are upper arm elements provided on the high potential side of the U2, V2, and W2 phases, respectively, and the switching elements 624, 625, and 626 of the second inverter 602 are lower arm elements provided on the low potential side of the U2, V2, and W2 phases, respectively.

The first inverter 601 applies a voltage to each of the phase winding wires 811, 812, 813 of the first set of three-phase winding 801, and the second inverter 602 applies each of the phase winding wires 821, 822, 823 of the second set of three-phase winding 802. In the present embodiment, the first inverter 601 and the second inverter 602 respectively output alternating currents to the two sets of three-phase winding 801, 802, a phase difference among which is (30±60×k) [deg] (k is an integer).

In the first embodiment, the first inverter 601 and the second inverter 602 are supplied with electric power from the same DC power source 51. That is, the first inverter 601 and the second inverter 602 are connected in parallel to the DC power source 51. A smoothing capacitor 53 is provided for input sections of the inverters 601 and 602. Note that a power source relay which can interrupt a path connected to a positive electrode of the DC power source 51 is omitted from FIG. 7. Further, based on divided voltages Vr1 and Vr2, post-power-source-relay voltages of the respective inverters 601 and 602, that is, input voltages Vin1 and Vin2 to the inverters 601, 602 are detected.

Phase currents Iu1, Iv1, Iw1, Iu2, Iv2 and Iw2 flowing through the respective phases of the inverters 601 and 602 are detected by current sensors 617, 618, 619, 627, 628, 629. Phase currents supplied to the two sets of three-phase winding 801 and 802 with respect to the phase currents Iu1, Iv1, Iw1, Iu2, Iv2, Iw2 flowing through the inverters 601 and 602 are respectively designated as Iu1 #, Iv1 #, Iw1 #, Iu2 #, Iv2 #, Iw2 #. The relationship between the two sets of phase currents, Iu1, Iv1, Iw1, Iu2, Iv2, Iw2 and Iu1 #, Iv1 #, Iw1 #, Iu2 #, Iv2 #, Iw2 #, changes depending on the specific DC motor to be driven. The details of the above are described later.

Further, the ECU 10 of the present embodiment includes DC motor relays M11, M12, M21, M22, M31, and M32 as "DC rotating machine relays," and three-phase motor relays M41, M51, M61, M42, M52, and M62 are provided as "polyphase rotating machine relays." These relays are also implemented as, for example, MOSFETs, and the control unit 30 controls to open and close them.

The DC motor relays M11 and M12 are provided at positions between either the U1 phase of the first set of three-phase winding 801 or the U2 phase of the second set of three-phase winding 802 and the winding wire 714 of the steering lock actuator 710, respectively. The DC motor relays M21 and M22 are provided at positions between either the V1 phase of the first set of three-phase winding 801 or the V2 phase of the second set of three-phase winding 802 and the winding wire 724 of the tilt actuator 720, respectively. The DC motor relays M31 and M32 are provided at positions between either the W1 phase of the first set of three-phase winding 801 or the W2 phase of the second set of three-phase winding 802 and the winding wire 734 of the telescopic actuator 730, respectively.

The control unit 30 turns ON the pair of DC motor relays of a phase connected to the specific DC motor, and turns OFF the other four DC motor relays in the other two phases. As a result, in the phase in which the DC motor relay is turned ON, the electric current from the inverters 601 and 602 is supplied to both of the three-phase motor 800 and the specific DC motor. On the other hand, in the phase in which the DC motor relay is turned OFF, the electric current from the inverters 601 and 602 is supplied only to the three-phase motor 800.

The three-phase motor relays M41, M51, M61 are provided in U1, V1 and W1 phase power paths between the first inverter 601 and the first set of three-phase winding 801, respectively. The three-phase motor relays M42, M52, M62 are provided in U2, V2, and W2 phase power paths between the second inverter 601 and the second set of three-phase winding 802, respectively. When the three-phase motor 800 is energized, the control unit 30 turns ON the three-phase motor relays M41, M51, M61, M42, M52, and M62. On the other hand, when the three-phase motor 800 is not energized, the control unit 30 turns OFF the three-phase motor relays M41, M51, M61, M42, M52, and M62.

Next, with reference to FIG. 8, the connection configuration of the device is described. As described above, the three-phase motor 800 is integrated with the ECU 10 including the two sets of inverters 601 and 602 and the control unit 30. On the other hand, the three DC motors 710, 720, and 730 are connected to the ECU 10 via connectors. That is, while the connection between the three-phase motor 800 and the ECU 10 is a fixed premise, the DC motors 710, 720, 730 and the ECU 10 are configured to be connectable as an option according to the needs.

FIG. 8 shows an example of the connector connection configuration. In this configuration example, a power connector 591, a signal connector 592, and a torque sensor connector 593 are provided separately. The power connector 591 is connected to a power source line (PIG) from the DC power source 51 and to a ground line. The signal connector 592 is connected to the wiring of each of the DC motors 710, 720, and 730 besides being connected to a control power source line (IG) and a CAN communication line. Note that, although motor wires (M+, M−) of the DC motors 710, 720, 730 are involved in power supply, they may be connected to the signal connector 592, because the motor current of those motors is smaller than that of the three-phase motor 800. If the electric current supplied to the DC motors 710, 720, 730 is large, another connector may be used for the connection of motor wires of the DC motors 710, 720, 730, or the motor wires of those motors may go into the power connector 591 together with the power source line (PIG) and the ground line from the DC power source 51.

Connection with the steering lock actuator 710 is established by two motor wires (M+, M−). Connection with the tilt actuator 720 and the telescopic actuator 730 is established by five motor wires, such as M+, M−, position sensor power wires, position sensor signal wires, and ground wires. Although an example which receives a signal from the tilt switch 12 and the telescopic switch 13 by CAN communication is described in FIG. 8, an analog voltage signal may also be received by the signal connector 592. The connectors may be divided for each of the DC motors 710, 720, and 730. The power source wire, the signal wire, and the ground wire of the torque sensor 94 are collectively connected to the torque sensor connector 593.

Next, the detailed configuration of the control unit 30 is described with reference to FIGS. 9 and 10. The control unit 30 includes a microcomputer, a drive circuit and the like, and is provided with a CPU, a ROM, an I/0 (not shown), and a bus line connecting these components. The control unit 30 performs control realized by (i) a software process by the CPU executing a program stored in advance in a readable non-transitory, tangible recording medium such as a ROM and/or (ii) a hardware process by a dedicated electronic circuit.

The control unit 30 operates controls operation of the switching elements 611 to 616 and 621 to 626, opens and closes the DC motor relays M11, M12, M21, M22, M31, M32 and the three-phase motor relays M41, M51, M61, M42, M52, M62, and controls energization to the three-phase motor 800 and the DC motors 710, 720, 730. The control unit 30 includes a first system three-phase control unit 301, a second system three-phase control unit 302, and a direct current (DC) control unit 40, in principle. Further, the control unit 30 includes a neutral point voltage correction calculation unit 39 that performs a correction calculation of the neutral point voltage of the two sets of the three-phase winding 801 and 802 based on the phase voltage calculation results of the two systems of three-phase control units 301 and 302.

Figure 9:
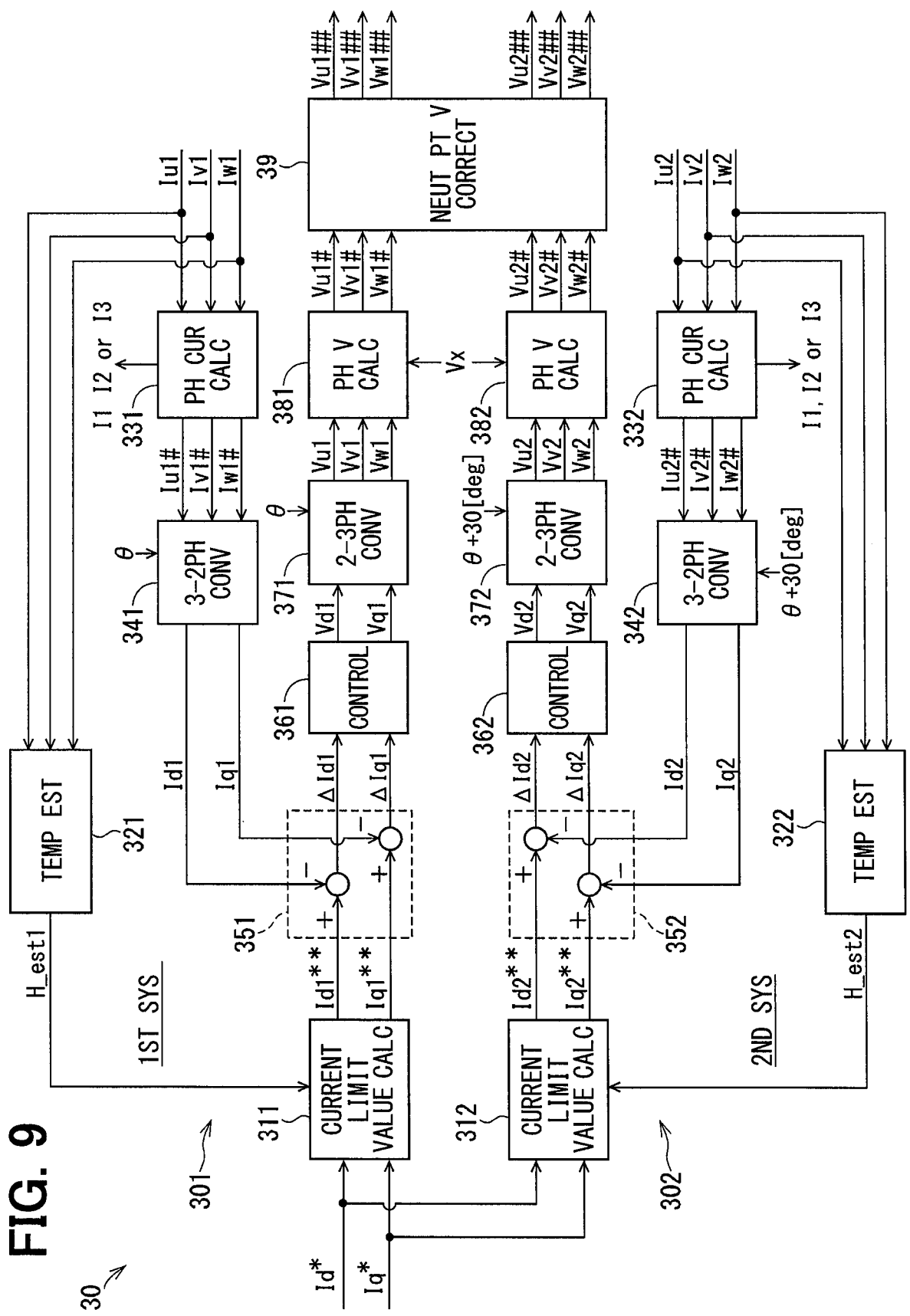
FIG. 9 is a control configuration diagram of a three-phase control unit.

In FIG. 9, "1" is suffixed as the third digit of the serial number in the configuration of the first system three-phase control unit 301. In the configuration of the second system three-phase control unit 302, "2" is suffixed as the third digit of the serial number. The same applies to the serial number of the electric current and voltage. The three-phase control units 301 and 302 of the respective systems include current limit value calculation units 311 and 312, temperature estimation calculation units 321 and 322, phase current calculation units 331 and 332, three-phase to two-phase conversion units 341 and 342, current deviation calculation units 351 and 352, controllers 361 and 362, two-phase to three-phase conversion units 371 and 372, and phase voltage calculation units 381 and 382. The configuration of the first system three-phase control unit 301 is described below as a representative example. The configuration of the second system three-phase control unit 302 is basically the same as the configuration of the first system three-phase control unit 301, thereby the description thereof is omitted.

The three-phase control units 301 and 302 respectively receive an input of dq-axis current instruction values Id* and Iq* calculated based on the steering torque Ts detected by the torque sensor 94. The current limit value calculation unit 311 calculates, based on the dq axis current instruction values Id* and Iq* and an estimated temperature H_est1, post-current-limitation dq axis current instruction values Id1 and Iq1. The current limit value is set to a lower value as the estimated temperature H_est1 is higher in order to prevent temperature rise of the switching elements 611 to 616 and the like exceeding a heat protection temperature.

The temperature estimation calculation unit 321 calculates the temperature rise due to energization from a product ($I^2R$) of the electric current square value and the resistance value based on the phase currents Iu1, Iv1, Iw1, and estimates substrate temperature of the inverter 601. Generally, in the three-phase motor control, the temperature rise is calculated based on the dq axis electric current after coordinate conversion. However, in the present embodiment, it is necessary to use the phase current before subtraction of the electric current that is supplied to the specific DC motor, and the configuration is different from that of the three-phase motor control used in general.

The phase current calculation unit 331 calculates the phase currents Iu1 #, Iv1 #, Iw1 # supplied to the first set of three-phase winding 801, and the DC current I1, I2 or I3 supplied to the specific DC motor, based on the phase currents Iu1, Iv1, Iw1 flowing through the first inverter 601. The phase currents Iu1 #, Iv1 #, Iw1 # are output to the three-phase to two-phase conversion unit 341. The DC current I1, I2 or I3 calculated by the phase current calculation unit 331 of the first system or by the phase current calculation unit 332 of the second system is output to the DC controller 40. The details of the phase current calculation are described later with reference to FIG. 12.

The three-phase to two-phase conversion unit 341 performs coordinate conversion of the phase currents Iu1 #, Iv1 #, Iw1 # using the electric angle θ, for example, (θ+30) [deg] in the second system, and feeds back the dq axis electric currents Id1, Iq1 to the current deviation calculation unit 351. The current deviation calculation unit 351 subtracts the dq axis electric currents Id1 and Iq1 from the dq axis current instruction values Id1 and Iq1 to calculate current deviations ΔId1 and ΔIq1. The controller 361 calculates dq axis voltage instructions Vd1 and Vq1 by PI control or the like, so that the current deviations ΔId1 and ΔIq1 come close to 0.

The two-phase to three-phase conversion unit 371 performs coordinate conversion of the dq axis voltage instructions Vd1 and Vq1 using the electric angle θ ((θ+30) [deg] in the second system) to calculate three-phase voltage instructions Vu1, Vv1 and Vw1. Further, the two-phase to three-phase conversion unit 371 converts the three-phase voltage instructions Vu1, Vv1, Vw1 to a duty ratio, and outputs the duty ratio to the phase voltage calculation unit 381. That is, pre-calculation phase voltages Vu1, Vv1, Vw1 input to the phase voltage calculation unit 381 respectively have a value in % from 0% to 100% with the median value of 50%.

The phase voltage calculation unit 381 calculates post-calculation phase voltages Vu1 #, Vv1 #, Vw1 # based on pre-calculation phase voltages Vu1, Vv1, Vw1 and DC voltage Vx applied from the DC control unit 40. Similarly, the phase voltage calculation unit 382 of the second system calculates post-calculation phase voltages Vu2 #, Vv2 #, and Vw2 #. The details of the phase voltage calculation are described later with reference to FIGS. 15 and 16.

The neutral point voltage correction calculation unit 39 obtains the first system post-calculation phase voltages Vu1 #, Vv1 #, Vw1 # and the second system post-calculation phase voltages Vu2 #, Vv2 #, Vw2 #, and performs a neutral point voltage correction calculation of the two sets of three-phase winding 801 and 802 based on the maximum value and the minimum value of the voltage in six phases of the two systems. Then, the neutral point voltage correction calculation unit 39 outputs the respective phase voltages Vu1 ##, Vv1 ##, Vw1 ##, Vu2 ##, Vv2 ##, Vw2 ## of the two systems posterior to a neutral point voltage correction. Details of the neutral point voltage correction calculation are described later with reference to FIG. 17. The control unit 30 adjusts an application voltage Vx applied to the three-phase motor 800 by controlling the neutral point voltage of the two sets of the three-phase winding 801 and 802 by the neutral point voltage correction calculation.

Figure 10:
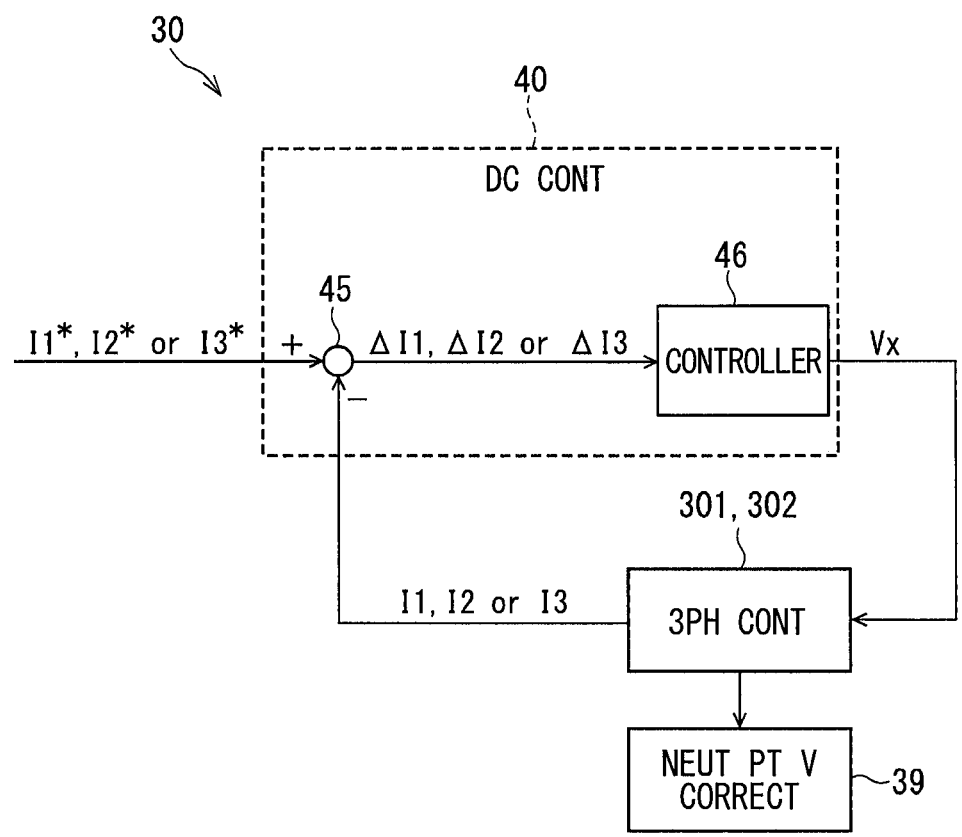
FIG. 10 is a control configuration diagram of a direct current control unit.

As shown in FIG. 10, the direct current control unit 40 has a current deviation calculator 45 and a controller 46. The current deviation calculator 45 calculates current deviations ΔI1, ΔI2 or ΔI3 by subtracting the DC current I1, I2 or I3 calculated by the phase current calculation unit 331 or 332 of the first system or the second system from the DC current instruction value I1*, I2* or I3* for the specific DC motor. The controller 46 calculates the application voltage Vx to the DC motor by PI control or the like, so that the current deviation ΔI1, ΔI2 or ΔI3 come close to 0, and outputs the voltage Vx to the phase voltage calculators 381 and 382 of the first system and the second system.

Figure 11:
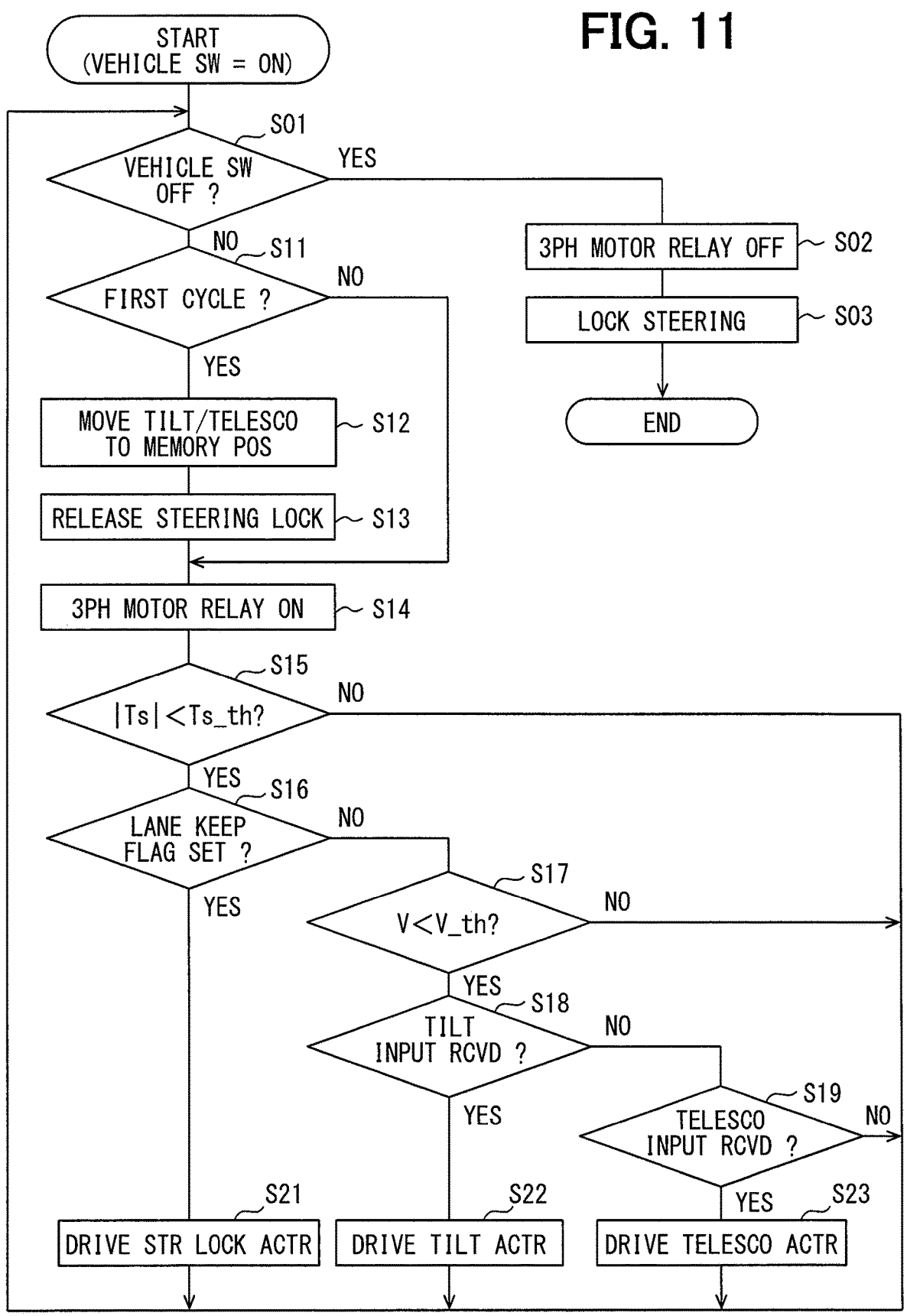
FIG. 11 is a flowchart of operation of the ECU.

Next, the operation of the ECU 10 is described with reference to the flowchart of FIG. 11. In the following description of the flowchart, a symbol "S" indicates a step. The routine of FIG. 11 starts when the vehicle switch 11 is turned ON. S01 is described in the second and subsequent cycles of the routine. In the first cycle after the start, that is, in the first routine, it is always determined as NO at S01, and the process proceeds to S11.

In the first routine, YES is determined at S11, and the process proceeds to S12. The control unit 30 drives the tilt actuator 720 and the telescopic actuator 730 at S12 to move the tilt and the telescopic positions to a memory position. Further, the control unit 30 drives the steering lock actuator 710 at S13 to release the steering lock. In the second and subsequent cycles of the routine, it is determined as NO at S11, and S12 and S13 are skipped.

The control unit 30 turns ON the three-phase motor relays M41, M51, M61, M42, M52, and M62 at S14 to set the three-phase motor 800 in a drivable state according to a torque request. In the EPS system 901, the three-phase motor 800 outputs a steering assist torque, and in the SBW system 902, the three-phase motor 800 outputs a reaction torque.

S15 to S23 are steps for selecting one specific DC motor from among the three DC motors 710, 720, 730. At S15, the control unit 30 determines whether an absolute value |Ts| of the steering torque is less than a torque threshold Ts_th (for example, 5 [Nm]). Here, according to the direction of the torque applied to the steering wheel 91, the steering torque Ts is defined, for example, as positive in the left rotation direction and negative in the right rotation direction. Basically, there is no difference in characteristics depending on the rotation direction, thereby the absolute value |Ts| of the steering torque is compared with the torque threshold Ts_th in terms of the steering torque Ts in both directions.

If the absolute value of the steering torque |Ts| is equal to or greater than the torque threshold Ts_th, that is, while the driver is operating the steering wheel 91, it is determined as NO at S15. Since it is preferable not to move the tilt or the telescopic position during the steering, the DC motors 710, 720, 730 are not energized during the steering operation, and the process returns to S01. On the other hand, if the absolute value of the steering torque |Ts| is smaller than the torque threshold Ts_th, that is, if the driver is not substantially steering, it is determined as YES at S15, and the process proceeds to S16. In this case, energization of the DC motors 710, 720, 730 is allowed.

At S16, it is determined whether or not the lane keep flag F has been input from the lane keep determination circuit 15. If it is determined as YES at S16, the control unit 30 drives, at S21, the steering lock actuator 710 which also functions as a steering vibration actuator. In this case, the steering lock actuator 710 warns the driver by vibrating the steering wheel 91.

If it is determined as NO at S16, it is determined at S17 whether the vehicle speed V is less than a vehicle speed threshold V_th (for example, 30 [km/h]). It is preferable not to move the tilt or the telescopic position during a high speed travel where the vehicle speed V is equal to or higher than the vehicle speed threshold V_th, when it is determined as NO at S17. Therefore, the tilt actuator 720 and the telescopic actuator 730 are not energized during the high speed travel, and the process returns to S01. On the other hand, at the time of low speed travel where the vehicle speed V is less than the vehicle speed threshold V_th, when it is determined as YES at S17, energization to the tilt actuator 720 and the telescopic actuator 730 is allowed.

If there is a tilt input from the tilt switch 12, YES is determined at S18, and the control unit 30 drives the tilt actuator 720 at S22. If NO is determined at S18, and there is a telescopic input from the telescopic switch 13, YES is determined at S19, and the control unit 30 drives the telescopic actuator 730 at S23.

After the drive of the direct current motor 710, 720 or 730 at S21, S22 or S23, or after it is determined as NO at S15 or S17, the process returns to S01, and it is determined whether the vehicle switch 11 is turned OFF. If the vehicle switch 11 remains to be turned ON, and it is determined as NO at S01, the routine after S11 is repeated. When the vehicle switch 11 is turned OFF and it is determined as YES at S01, the control unit 30 turns OFF the three-phase motor relays M41, M51, M61, M42, M52, and M62 at S02. Thereafter, at S03, the control unit 30 drives the steering lock actuator 710 to lock the steering, and the process is ended.

Next, a phase current calculation process performed by the phase current calculation units 331 and 332 is described with reference to the flowchart of FIG. 12 and the waveform diagrams of FIGS. 13A, 13B, 14A and 14B. The control unit 30 applies Kirchhoff's law to the electric current flowing from the inverters 601 and 602 to the two sets of three-phase winding 801 and 802, and calculates the phase currents Iu1 #, Iv1 #, Iw1 #, Iu2 #, Iv2 #, Iw2 # supplied to the three-phase motor 800 and the electric currents I1, I2, I3 supplied to the DC motors 710, 720, 730, respectively. In the following description of S35A to S35D, equations for the calculation process performed by the first phase current calculation unit 331 are shown, which is similarly applicable to the calculation process performed by the second phase current calculation unit 332.

Figure 12:
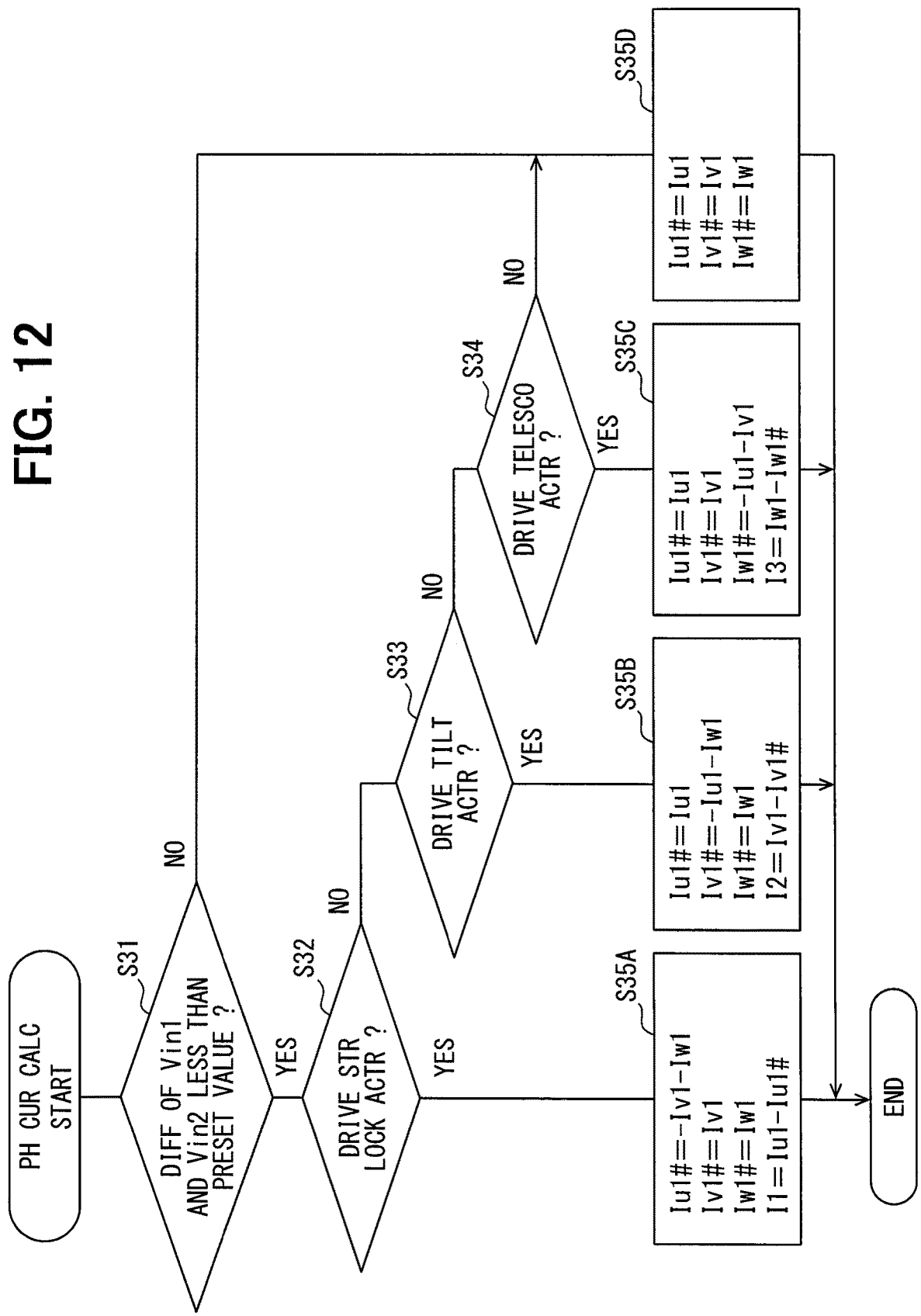
FIG. 12 is a flowchart of a phase current calculation process.

At S31 of FIG. 12, it is determined whether or not a difference between the input voltage Vin1 of the first inverter 601 and the input voltage Vin2 of the second inverter 602 is less than a predetermined value. If it is determined as YES, the process proceeds to S32. If the difference between the input voltages Vin1 and Vin2 is equal to or greater than a predetermined value, that is, if it is determined as NO at S31, the control unit 30 does not energize the DC motors 710, 720, and 730.

When the steering lock actuator 710 is driven, it is determined as YES at S32, and the process proceeds to S35A. At S35A, the phase currents Iu1 #, Iv1 #, Iw1 # supplied to the first set of three-phase winding 801, and the electric current I1 supplied to the steering lock actuator 710 are calculated by equations (1.1a) to (1.4a).

$$Iu1\# = -Iv1 - Iw1 \quad (1.1a)$$

$$Iv1\# = Iv1 \quad (1.2a)$$

$$Iw1\# = Iw1 \quad (1.3a)$$

$$I1 = Iu1 - Iu1\# \quad (1.4a)$$

Figure 13A:
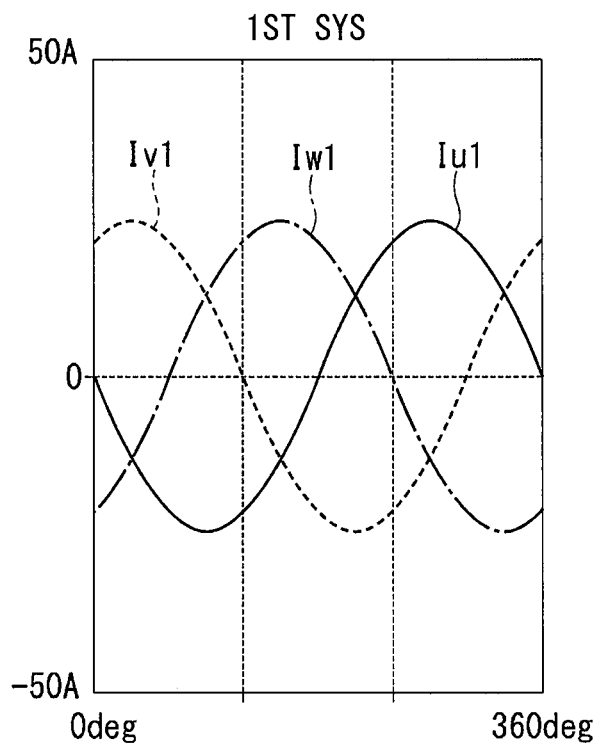
FIG. 13A is an illustration of waveform of a phase current flowing in a first inverter.
Figure 13B:
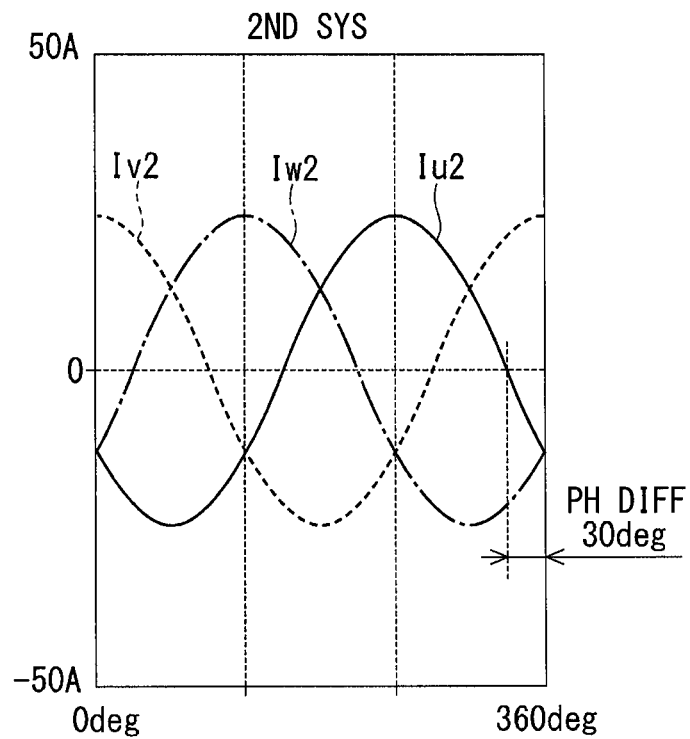
FIG. 13B is an illustration of waveform of a phase current flowing in a second inverter.

FIG. 13A shows waveforms of the phase currents Iu1, Iv1 and Iw1 flowing through the first inverter 601, and FIG. 13B shows waveforms of the phase currents Iu2, Iv2 and Iw2 flowing through the second inverter 602. The phase currents Iu2, Iv2, Iw2 have a phase difference of 30 [deg] with respect to the phase currents Iu1, Iv1, Iw1.

Figure 14A:
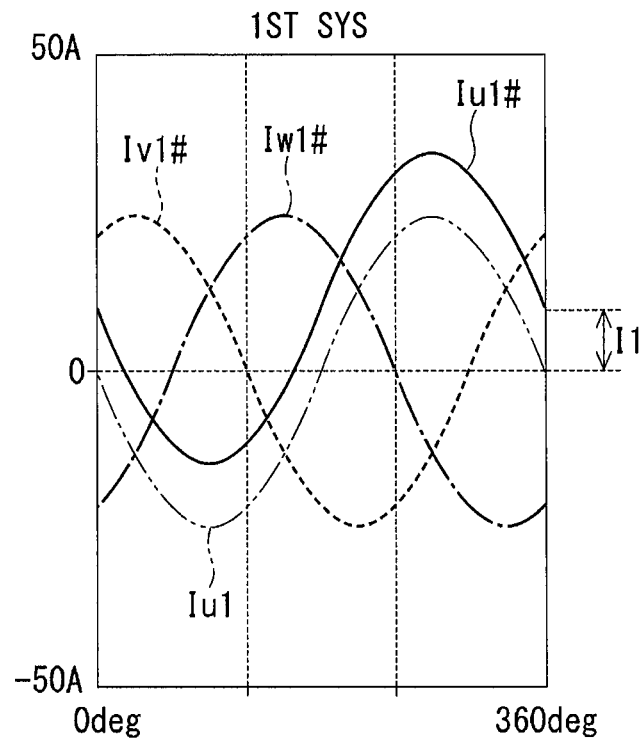
FIG. 14A is an illustration of waveform of a phase current supplied to the first set of three-phase winding.
Figure 14B:
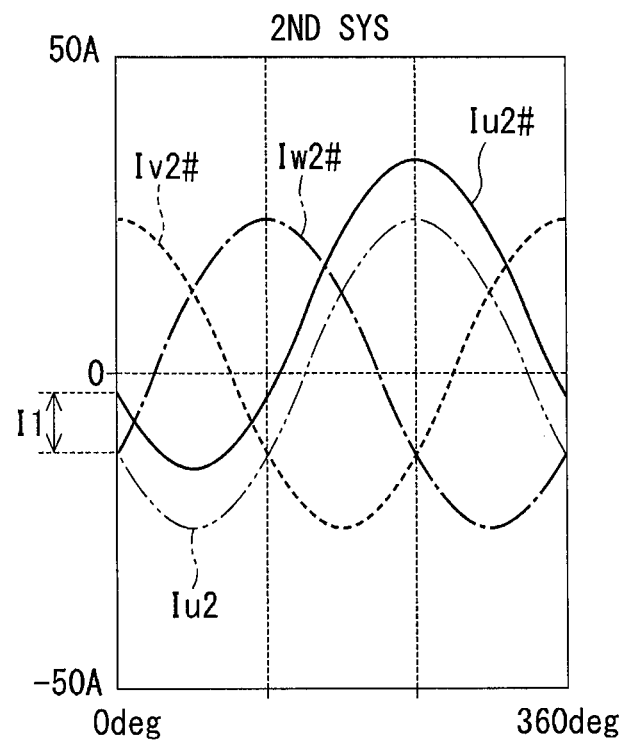
FIG. 14B is an illustration of waveform of a phase current supplied to the second set of three-phase winding.

FIG. 14A shows waveforms of the phase currents Iu1 #, Iv1 #, Iw1 # spplied to the first set of three-phase winding 801 at S35A, and FIG. 14B shows waveforms of the phase currents Iu2 #, Iv2 #, Iw2 # supplied to the second set of three-phase winding 802. The phase currents Iu1 # and Iu2 # of the two sets of three-phase winding 801 and 802 are offset with respect to the phase currents Iu1 and Iu2 indicated by two-dot chain lines, respectively, and this offset corresponds to the DC current I1.

When the tilt actuator 720 is driven, it is determined as NO at S32 and it is determined as YES at S33, and the process proceeds to S35B. At S35B, the phase currents Iu1 #, Iv1 #, Iw1 # supplied to the first set of three-phase winding 801 and the electric current I2 supplied to the tilt actuator 720 are calculated by equations (1.1b) to (1.4b).

$$Iu1\# = Iu1 \tag{1.1b}$$

$$Iv1\# = -Iu1 - Iw1 \tag{1.2b}$$

$$Iw1\# = Iw1 \tag{1.3b}$$

$$I2 = Iv1 - Iv1\# \tag{1.4b}$$

When the telescopic actuator 730 is driven, it is determined as NO at S32, and it is determined as NO at S33, and it is determined as YES at S34, and the process proceeds to S35C. At S35C, the phase currents Iu1 #, Iv1 #, Iw1 # supplied to the first set of three-phase winding 801 and the electric current I3 supplied to the telescopic actuator 730 are calculated by equations (1.1c) to (1.4c).

$$Iu1\# = Iu1 \tag{1.1c}$$

$$Iv1\# = Iv1 \tag{1.2c}$$

$$Iw1\# = -Iu1 - Iv1 \tag{1.3c}$$

$$I3 = Iw1 - Iw1\# \tag{1.4c}$$

If it is determined as NO at S31 or S34, none of the DC motors 710, 720, 730 are driven, and the process proceeds to S35D. At S35D, the phase currents Iu1 #, Iv1 #, Iw1 # supplied to the first set of three-phase winding 801 are calculated by equations (1.1d) to (1.3d).

$$Iu1\# = Iu1 \tag{1.1d}$$

$$Iv1\# = Iv1 \tag{1.2d}$$

$$Iw1\# = Iw1 \tag{1.3d}$$

Figure 15:
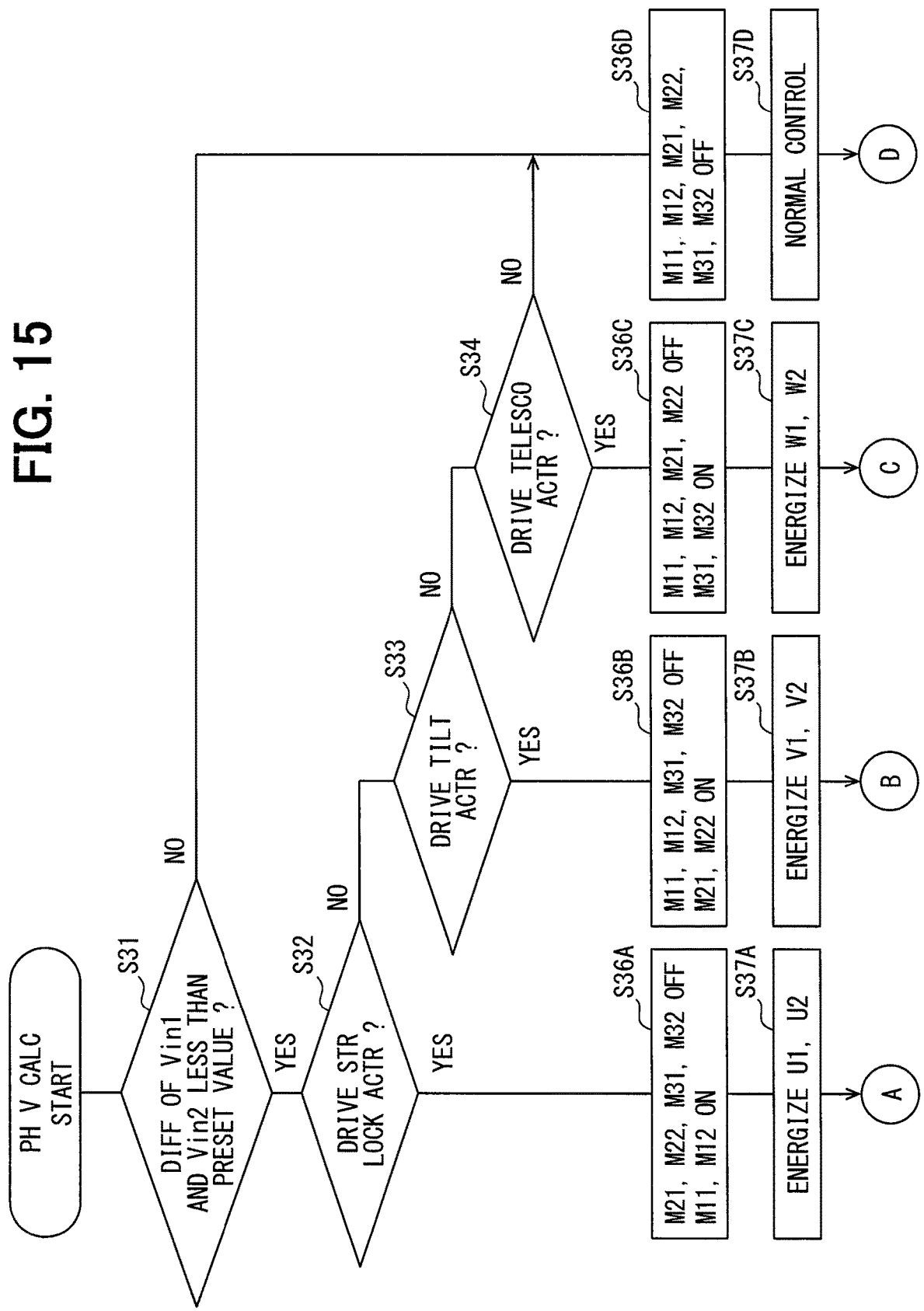
FIG. 15 is a flowchart (1) of a phase voltage calculation process.
Figure 16:
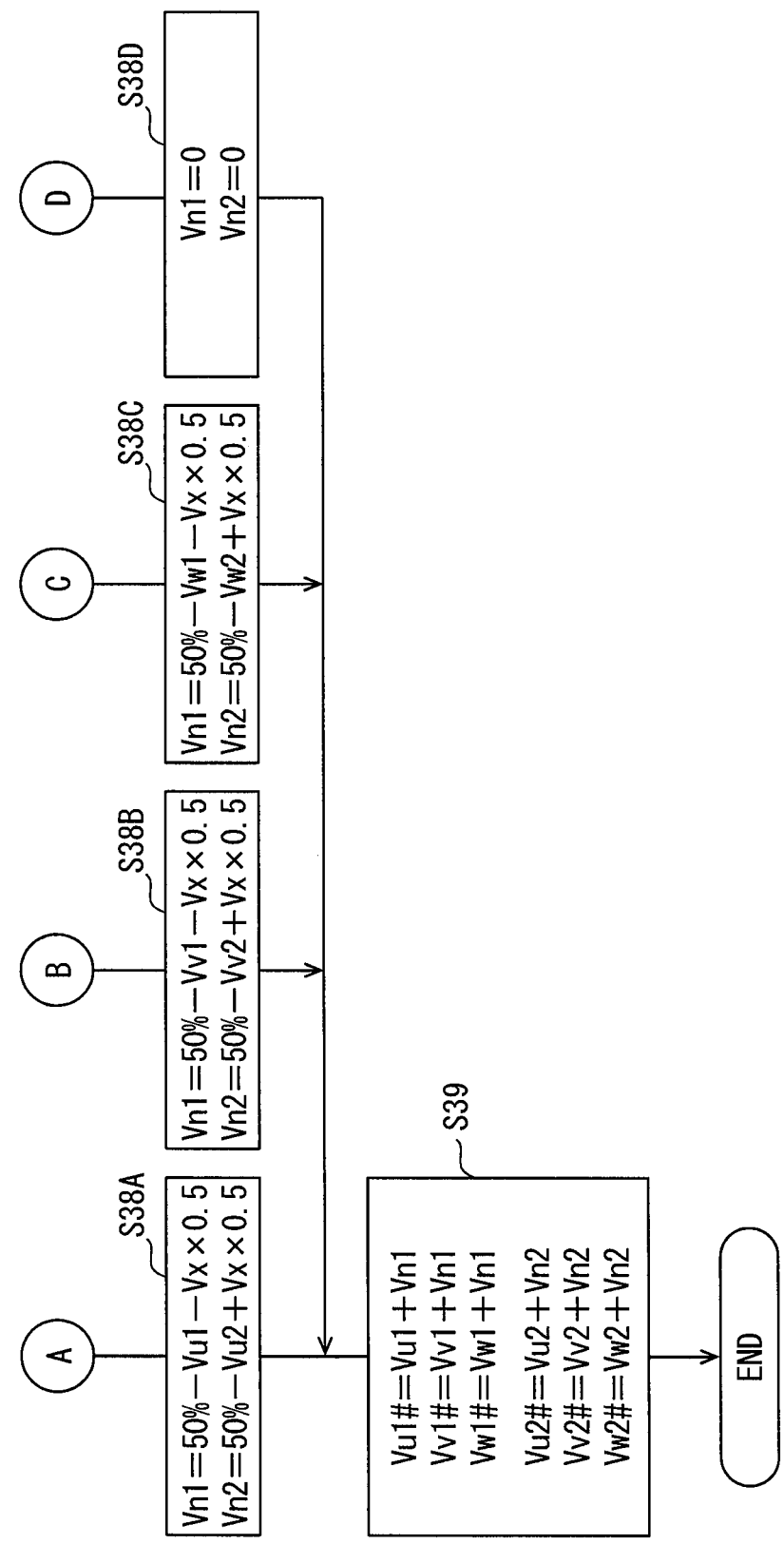
FIG. 16 is a flowchart (2) of the phase voltage calculation process.

Next, a phase voltage calculation process performed by the phase voltage calculation units 381 and 382 is described with reference to flowcharts of FIGS. 15 and 16. FIG. 15 and FIG. 16 are continuous through linking symbols A, B, C, D. S31 of FIG. 15 is the same as that of FIG. 12. As described above, the phase voltages Vu1, Vv1, Vw1, Vu2, Vv2 and Vw2 are respectively defined as a duty ratio, that is, a value of 0% to 100% with the median value being 50%. Further, Vn1 and Vn2 may respectively be considered as an offset voltage for offsetting the phase voltages of the inverters 601 and 602.

In the following equations of the offset voltages Vn1 and Vn2, one half, that is, Vx×0.5 of the application voltage Vx to the DC motor is subtracted on the Vn1 side and added on the Vn2 side, but the subtraction/addition may be reversed depending on a definition of the sign, plus or minus of Vx. That is, addition may be performed on the Vn1 side and subtraction may be performed on the Vn2 side.

When the steering lock actuator 710 is driven, it is determined as YES at S32, and the process proceeds to S36A to S38A. At S36A, the direct current motor relays M21, M22, M31, and M32 are turned OFF, and M11 and M12 are turned ON. At S37A, the U1 phase and the U2 phase are energized. At S38A, the offset voltages Vn1 and Vn2 are calculated by equations (2.1a) and (2.2a).

$$Vn1 = 50\% - Vu1 - Vx \times 0.5 \tag{2.1a}$$

$$Vn2 = 50\% - Vu2 + Vx \times 0.5 \tag{2.2a}$$

When the tilt actuator 720 is driven, it is determined as NO at S32 and it is determined as YES at S33, and the process proceeds to S36B to S38B. At S36B, the DC motor relays M11, M12, M31, and M32 are turned OFF, and M21 and M22 are turned ON. At S37B, the V1 phase and the V2 phase are energized. At S38B, the offset voltages Vn1 and Vn2 are calculated by equations (2.1b) and (2.2b).

$$Vn1 = 50\% - Vv1 - Vx \times 0.5 \tag{2.1b}$$

$$Vn2 = 50\% - Vv2 + Vx \times 0.5 \tag{2.2b}$$

When the telescopic actuator 730 is driven, it is determined as NO at S32, it is determined as NO at S33, and it is determined as YES at S34, and the process proceeds to S36C to S38C. At S36C, the direct current motor relays M11, M12, M21, and M22 are turned OFF, and M31 and M32 are turned ON. At S37C, the W1 phase and the W2 phase are energized. At S38C, the offset voltages Vn1 and Vn2 are calculated by equations (2.1c) and (2.2c).

$$Vn1 = 50\% - Vw1 - Vx \times 0.5 \tag{2.1c}$$

$$Vn2 = 50\% - Vw2 + Vx \times 0.5 \tag{2.2c}$$

When it is determined as NO at S31 or S34, none of the DC motors 710, 720, 730 are driven, and the process proceeds to S36D to S38D. At S36D, all DC motor relays M11, M12, M21, M22, M31, M32 are turned OFF, and at S37D, normal control, that is, energization of only the three-phase motor 800 is performed. At S38D, the operation voltages Vn1 and Vn2 are calculated by the equations (2.1d) and (2.2d). In this case, the phase voltage is not controlled.

$$Vn1 = 0 \tag{2.1d}$$

$$Vn2 = 0 \tag{2.2d}$$

Subsequently, at S39, in common to the above four cases, the post-calculation phase voltages Vu1 #, Vv1 #, Vw1 #, Vu2 #, Vv2 #, Vw2 # in the two systems are calculated by equations (3.1) to (3.6). That is, the offset voltages Vn1 and Vn2 are added commonly to each phase of each system.

$$Vu1\# = Vu1 + Vn1 \tag{3.1}$$

$$Vv1\# = Vv1 + Vn1 \tag{3.2}$$

$$Vw1\# = Vw1 + Vn1 \tag{3.3}$$

$$Vu2\# = Vu2 + Vn2 \tag{3.4}$$

$$Vv2\# = Vv2 + Vn2 \tag{3.5}$$

$$Vw2\# = Vw2 + Vn2 \tag{3.6}$$

Figure 17:
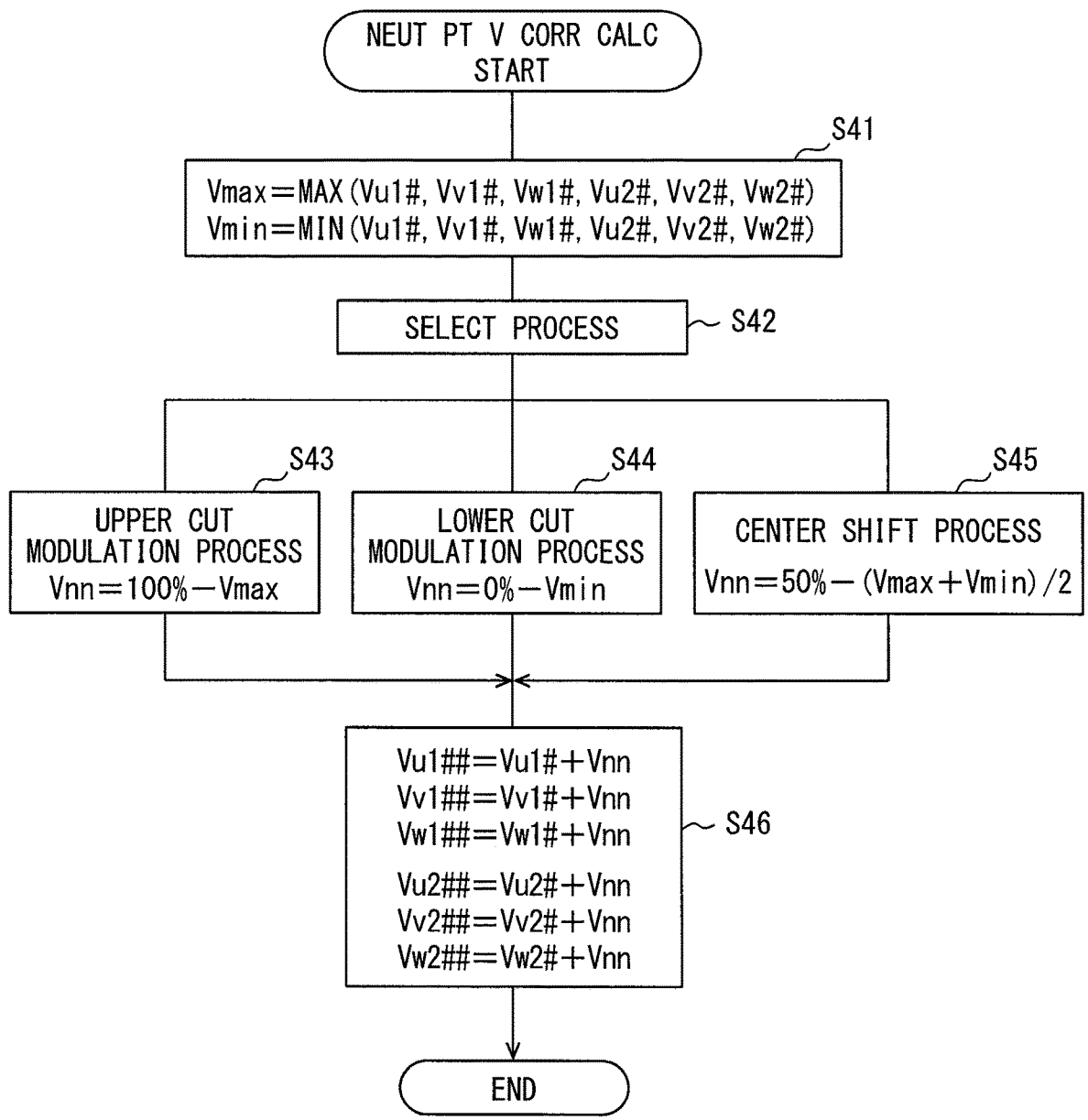
FIG. 17 is a flowchart of a neutral point voltage correction calculation process.

Next, a neutral point voltage correction calculation process performed by the neutral point voltage correction calculation unit 39 is described with reference to the flowchart of FIG. 17 and the waveform diagram of FIGS. 18A and 18B. At S41, a maximum value Vmax and a minimum value Vmin of the phase voltages Vu1 #, Vv1 #, Vw1 #, Vu2 #, Vv2 #, and Vw2 # in the two systems are calculated. At S42, one of an upper cut (shift) modulation process, a lower cut (shift) modulation process, and a center shift process is selected.

When the upper cut modulation process is selected, a neutral point offset voltage Vnn is calculated by an equation (4.1) at S43. A term "100%" in the equation corresponds to a "preset upper limit value." A value other than 100% may also be used as the "preset upper limit value."

$$Vnn = 100\% - Vmax \tag{4.1}$$

If the lower cut modulation process is selected, the neutral point operating voltage Vnn is calculated by an equation (4.2) at S44. Here, "0%" in the equation corresponds to a "preset lower limit value." A value other than 0% may also be used as the "preset lower limit value."

$$Vnn=0\%-V\text{min} \tag{4.2}$$

When the center movement process is selected, the neutral point operating voltage Vnn is calculated by an equation (4.3) at S45. Here, "50%" in the equation corresponds to a "preset median value." A value other than 50% may also be used as the "preset median value."

$$Vnn=50\%-(V\text{max}+V\text{min})/2 \tag{4.3}$$

At S46, which is in common to all three processes, the neutral point offset voltage Vnn is added respectively to the phase voltages Vu1 #, Vv1 #, Vw1 #, Vu2 #, Vv2 #, Vw2 # in the two systems by equations (5.1) to (5.6), and post-correction phase voltages Vu1 ##, Vv1 ##, Vw1 ##, Vu2 ##, Vv2 ##, and Vw2 ## corrected by the neutral point voltage are calculated.

$$Vu1\#\#=Vu1\#+Vnn \tag{5.1}$$

$$Vv1\#\#=Vv1\#+Vnn \tag{5.2}$$

$$Vw1\#\#=Vw1\#+Vnn \tag{5.3}$$

$$Vu2\#\#=Vu2\#+Vnn \tag{5.4}$$

$$Vv2\#\#=Vv2\#+Vnn \tag{5.5}$$

$$Vw2\#\#=Vw2\#+Vnn \tag{5.6}$$

In summary, the neutral point voltage correction calculation unit 39 controls the neutral point voltage of the two sets of three-phase winding 801 and 802 by the following three processes.

(1) An upper cut modulation process, which adds, to a voltage instruction of each phase, a value Vnn obtained by subtracting the maximum voltage instruction Vmax of the voltage instructions of all phases of the two sets of inverters 601 and 602 from a preset upper limit value (for example, 100%).

(2) A lower cut modulation process, which adds, to a voltage instruction of each phase, a value Vnn obtained by subtracting the minimum voltage instruction Vmin of the voltage instructions of all phases of the two sets of inverters 601 and 602 from a preset lower limit value (for example, 0%).

(3) A center shift process, which adds, to a voltage instruction of each phase, a value Vnn obtained by subtracting an average value of the maximum voltage instruction Vmax and the minimum voltage instruction Vmin among the voltage instructions of all phases of the two sets of inverters 601 and 602 from a preset median value (for example, 50%).

Figure 18A:
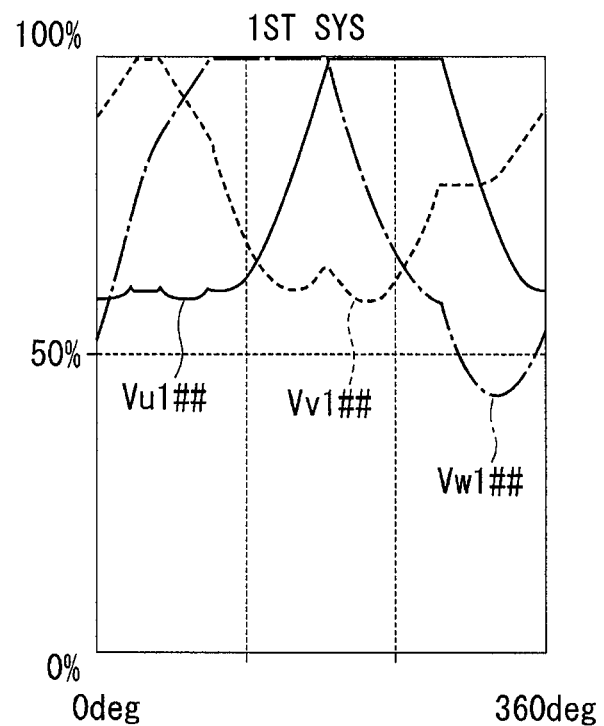
FIG. 18A is an illustration of waveform of a post-correction first system phase voltage by an upper-cut (upper shift) modulation process.
Figure 18B:
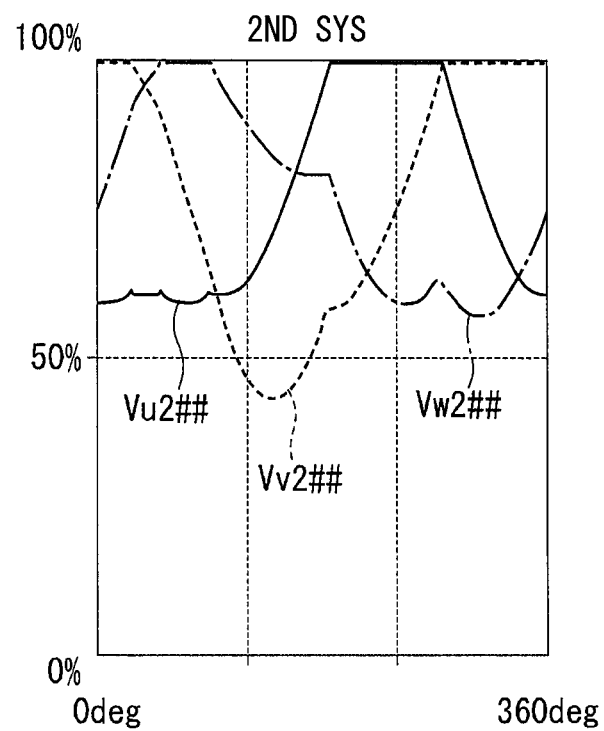
FIG. 18B is an illustration of waveform of a post-correction second system phase voltage of the same.

FIG. 18A shows an example of the waveforms of the first-system phase voltages vu1 ##, Vv1 ##, Vw1 ## after correction by the upper cut modulation process, and FIG. 18B shows an example of the waveform of the second-system phase voltages Vu2 ##, Vv2 ##, Vw2 ## after correction by the upper cut modulation process. As disclosed in a Japanese Patent Application Laid-Open No. 2011-188674 and the like, the waveform after the normal upper cut modulation process preserves symmetry (or similarity) among three phases. However, in the present embodiment, due to the supply of electric power to the specific DC motor, the waveform becomes asymmetric.

Figure 19:
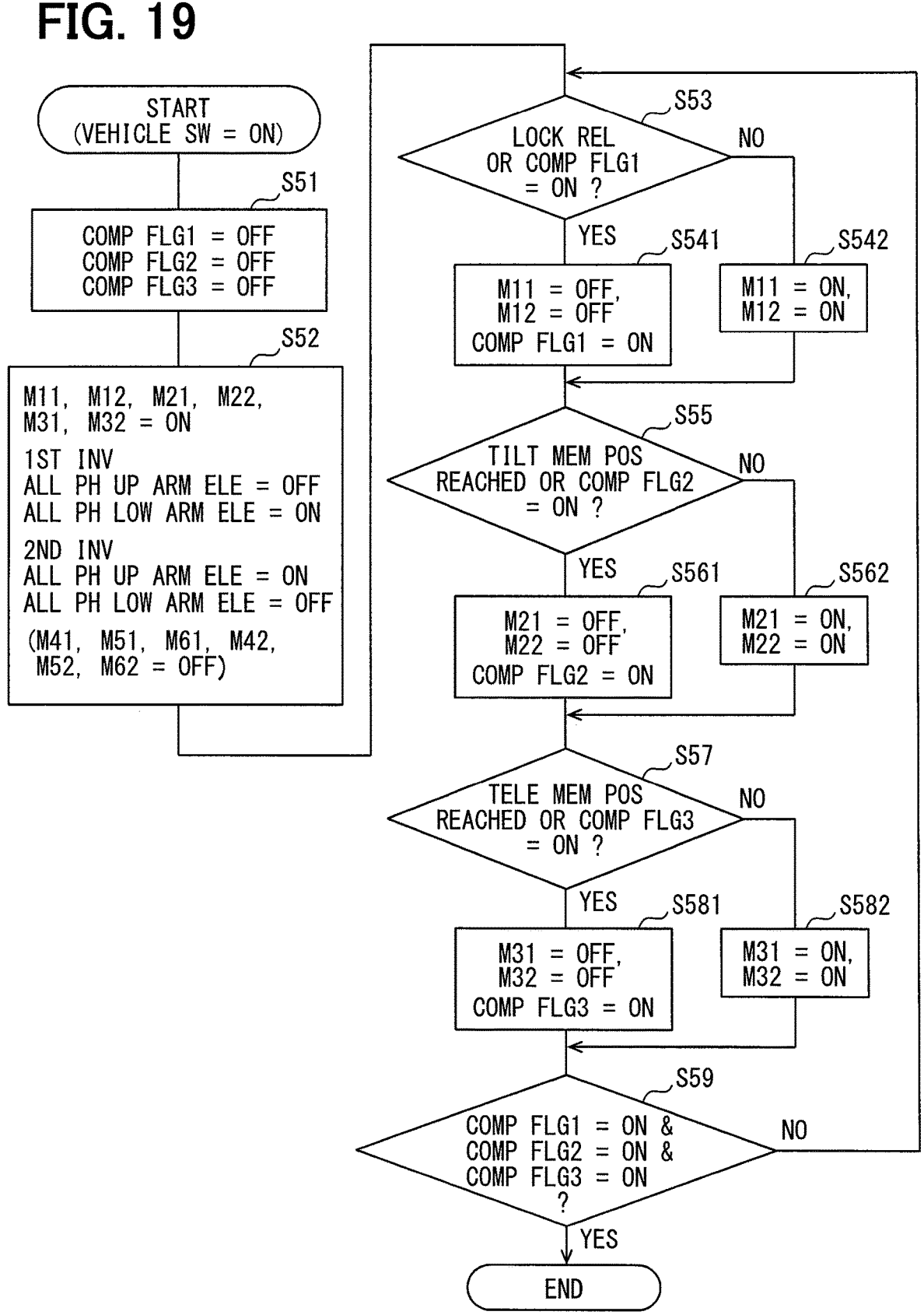

Next, with reference to FIG. 19, an operation immediately after turning ON of the vehicle switch 11 is described. In the present embodiment, when the three-phase motor 800 is not energized, the two or three DC motors are simultaneously energizable by adjusting the potential difference between the respective phases of the two sets of three-phase winding 801 and 802. In addition, immediately after turning ON of the vehicle switch 11, there may be a requirement that the tilt actuator 720 and the telescopic actuator 730 are moved to a memory position as quickly as possible. Therefore, when the absolute value |Ts| of the steering torque is low and the vehicle speed V is low, the three-phase motor 800 is not energized and the plurality of DC motors 710, 720, 730 are simultaneously energized.

In FIG. 19, a completion flag 1 is OFF during the steering lock, and turns ON when the lock is released. A completion flag 2 is OFF when the tilt position is other than the memory position, and turns ON when the tilt position reaches the memory position. A completion flag 3 is OFF when the telescopic position is other than the memory position, and turns ON when the telescopic position reaches the memory position. At S51 immediately after turning ON of the vehicle switch 11, the completion flag 1, the completion flag 2, and the completion flag 3 are all set to OFF as initial values.

At S52, the control unit 30 turns ON all DC motor relays M11, M12, M21, M22, M31 and M32. Further, the control unit 30 turns OFF the upper arm elements 611, 612 and 613, turns ON the lower arm elements 614, 615 and 616 in all phases of the first inverter 601, and turns ON the upper arm elements 621, 622 and 623, and turns OFF the lower arm elements 624, 625 and 626 in all phases of the second inverter 602. Note that, for reversing a rotation direction of the DC motors 710, 720, 730, ON and OFF of the inverters 601 and 602 may be reversed. In such manner, the three-phase motor 800 is not energized, and the DC motors 710, 720, 730 can be energized simultaneously. Further, the control unit 30 may turn OFF all of the three-phase motor relays M41, M51, M61, M42, M52, and M62.

At S53, it is determined whether the steering lock is released or the completion flag 1 is ON. If it is determined as YES at S53, the DC motor relays M11 and M12 are turned OFF at S541. At this time, the completion flag 1 is ON. If it is determined as NO at S53, the DC motor relays M11 and M12 are maintained in the ON state at S542, and energization of the steering lock actuator 710 is continued.

At S55, it is determined whether the tilt position has reached the memory position or the completion flag 2 is ON. If it is determined as YES at S55, the DC motor relays M21 and M22 are turned OFF at S561. At this time, the completion flag 2 is ON. If it is determined as NO at S55, the DC motor relays M21 and M22 are maintained in the ON state at S562, and the energization of the tilt actuator 720 is continued.

At S57, it is determined whether the telescopic position has reached the memory position or the completion flag 3 is ON. If it is determined as YES at S57, the DC motor relays M31 and M32 are turned OFF at S581. At this time, the completion flag 3 is ON. If it is determined as NO at S57, the DC motor relays M31 and M32 are maintained in the ON state at S582 and the energization of the telescopic actuator 730 is continued.

At S59, it is determined whether all of the completion flag 1, the completion flag 2 and the completion flag 3 have been turned ON as a result of performing one of S542, S562 and S582. If all the completion flags are ON and it is determined as YES at S59, the process ends. On the other hand, if any of the completion flag 1, the completion flag 2 or the completion flag 3 is OFF, it is determined as NO at S59, and the process returns to S53, and the determination steps of S53, S55, and S57 are repeated.

[Effects]

(1) The ECU 10 according to the present embodiment is capable of driving (i) a single three-phase motor 800 including two sets of three-phase winding, that is, a first set of three-phase winding 801 and a second set of three-phase winding 802, and (ii) one to three direct current motors 710, 720, 730. The DC motors 710, 720, 730 are respectively connected at positions between the one phase of the first set of three-phase winding 801 and the one corresponding phase of the second set of three-phase winding 802 without redundancy. The control unit 30 controls the operation of the switching elements for controlling energization of the three-phase motor 800 and the DC motors 710, 720, 730.

The control unit 30 supplies electric power to the three-phase motor 800 while driving the DC motors 710, 720, 730 by adjusting the voltages applied to the three phases of the first set of three-phase winding 801 and the second set of three-phase winding 802. In such manner, energization of the three-phase motor 800 and energization of the DC motors 710, 720, 730 can be simultaneously controlled in the present embodiment.

(2) The ECU 10 in the present embodiment adjusts the application voltage Vx applied to the specific DC motor by controlling the neutral point voltage of the two sets of three-phase winding 801 and 802. By controlling the neutral point voltage for adjusting the application voltage Vx to a desired value, energization of the three-phase motor 800 and energization of the specific DC motor are performable without compromise.

The process of controlling the neutral point voltage is implemented either by the upper cut modulation process, the lower cut modulation process, the center shift process or the like. The control unit 30 can calculate the electric current supplied to the three-phase motor 800 and to the specific DC motor by using Kirchhoff's law for the electric current flowing from the inverters 601 and 602 to the two sets of three-phase winding 801 and 802.

(3) The ECU 10 of the present embodiment includes the DC motor relays M11, M21, M31, M12, M22, M32 provided at positions between the inverters 601, 602 and the DC motors 710, 720, 730. Then, the control unit 30 turns ON the DC motor relays connected to the specific DC motor selected as the target of current supply, and turns OFF the DC motor relays connected to the other DC motors, thereby appropriately controlling energization of the specific DC motor.

(4) In the present embodiment, the ECU 10 and the three-phase motor 800 are integrated in one body, and the ECU 10 and the DC motors 710, 720, and 730 are connected via connectors. By integrating the three-phase motor 800, which is a main control target, with the ECU 10, advantageous effects such as concentration of mount space, reduction of noise and voltage loss as well as improvement in reliability are achievable by reducing wiring. On the other hand, by connecting the respective DC motors 710, 720, and 730 with connectors, a degree of freedom of selection can be improved according to the model of the vehicle and/or the needs of the driver.

(5) The ECU 10 of the present embodiment is suitably applied as a controller of a three-phase motor 800, which may serve as a steering assist motor of the EPS system 901 or a reaction force motor of the SBW system 902. In such case, it is effective to implement a tilt actuator 720 or a telescopic actuator 730 as a DC motor.

Further, under such premise, energization of the DC motors 710, 720, 730 is preferably allowed exclusively when the vehicle speed V is less than the vehicle speed threshold V_th or exclusively when the absolute value of the steering torque |Ts| is less than the torque threshold Ts_th. In such manner, the tilt operation or the telescopic operation is securely prohibited during a high-speed travel of the vehicle or during a steering operation of the driver, which may hinder the drive operation.

(6) The ECU 10 of the present embodiment turns ON the all-phase lower arm elements of one inverter and the all-phase upper arm elements of the other inverter when the specific DC motor is energized and the three-phase motor 800 is not energized. By putting the two sets of three-phase winding 801 and 802 in a zero voltage vector state, a no energization state is realized in which the three-phase motor 800 receives no electric power. Further, by securing a current path from the upper arm element of one inverter to the lower arm element of the other inverter via the specific DC motor, energization of the specific DC motor is performable.

Further, the ECU 10 includes the three-phase motor relays M41, M51, M61, M42, M52, and M62 provided at positions between the inverters 601 and 602 and the two sets of three-phase winding 801 and 802, and, when the three-phase motor 800 is not energized, the direct current (DC) motor relays M11, M21, M31, M12, M22, and M32 may be turned OFF. In such manner, even when there is a variation in the operation characteristics among the respective inverter switching elements, the electric current is reliably interrupted.

(7) In the present embodiment, the two sets of inverters 601 and 602 output the alternating currents with the phase difference of (30±60×k) [deg] (k is an integer) to the two sets of three-phase winding 801 and 802. In such manner, when a harmonic component by distortion of the magnetic flux or the like is imposed on a three-phase electric current, the harmonic component is canceled among plural systems, thereby reducing a torque ripple. Further, the electric angle at a peak timing of the phase voltage is different among the two sets of three-phase winding 801 and 802, thereby making it possible to reserve a wider voltage range is for the voltage application to both of the three-phase winding and the DC motors 710, 720, 730, in comparison to a situation in which the phase difference among the plurals sets of three-phase winding is 0 [deg].

(8) When the difference between the input voltage Vin1 of the first inverter 601 and the input voltage Vin2 of the second inverter 602 is equal to or greater than a predetermined value, the ECU 10 of the present embodiment does not energize the DC motors 710, 720, 730. By stopping the energization in a power source unstable state, malfunction of the DC motors 710, 720, 730 is preventable.

Second Embodiment

Figure 20:
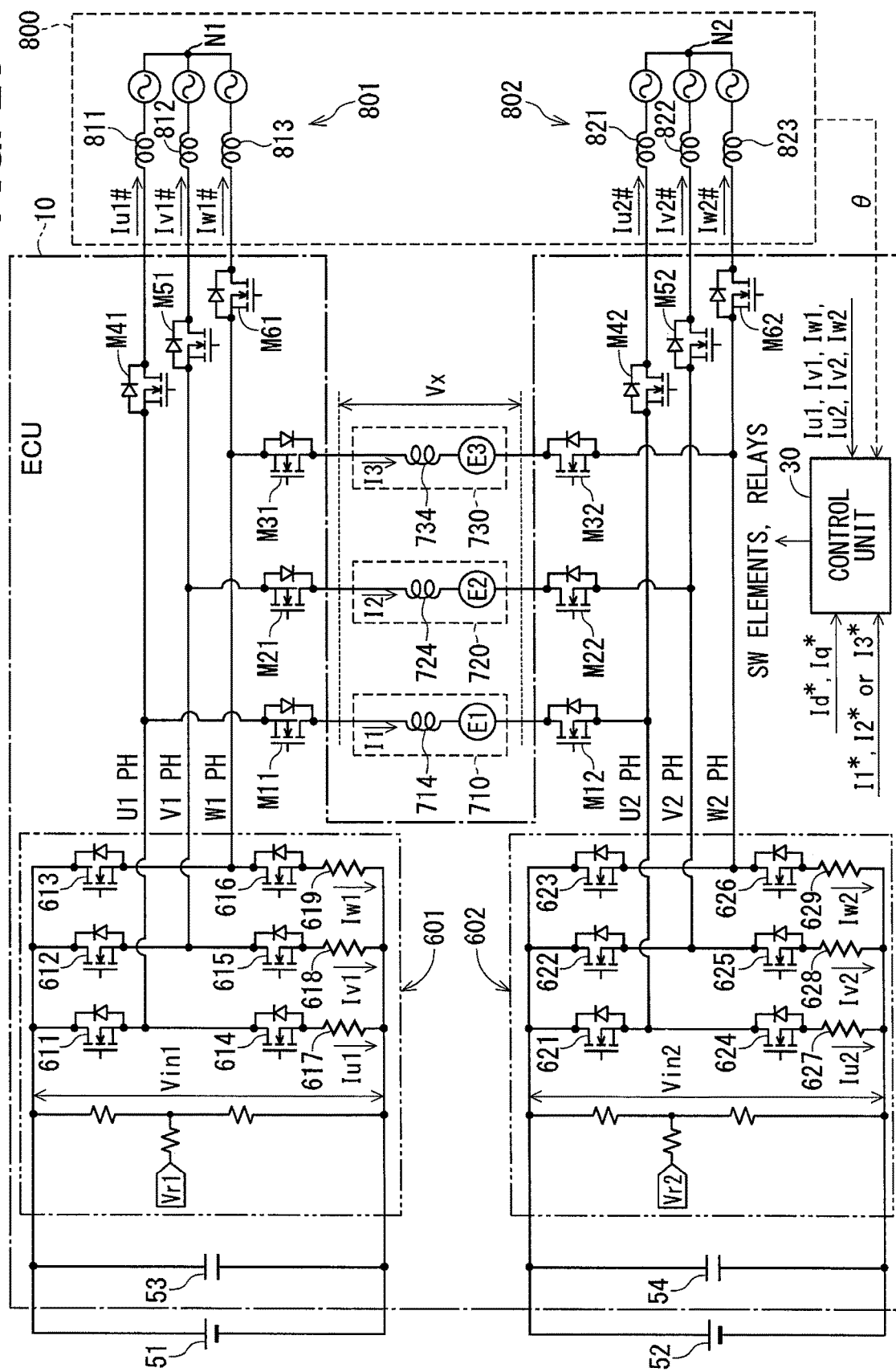
FIG. 20 is a circuit configuration diagram of the ECU according to a second embodiment of the present disclosure.

The second embodiment of the present disclosure is described with reference to FIG. 20. In FIG. 20, the same reference numerals represent the same parts in FIG. 7. In the second embodiment, the first inverter 601 and the second inverter 602 are respectively connected to two independent DC power sources 51 and 52. In addition, smoothing capacitors 53 and 54 are individually provided for input sections of the inverters 601 and 602, respectively. That is, the second embodiment is a so-called "complete duplex system" having a redundant configuration, and other parts other than the connection to the DC power sources 51 and 52 are the same as the first embodiment.

In such a configuration, the same control as that of the first embodiment is performable. At S31 of FIG. 12 and FIG. 15, when the difference between the input voltages Vin1 and Vin2 of the inverters 601 and 602 is equal to or greater than a predetermined value and it is determined as NO, the control unit 30 does not energize the DC motors 710, 720, and 730. In the second embodiment, as compared with the first embodiment, a possibility of having the input voltages Vin1 and Vin2 of the two systems further diverted from each other is higher than the first embodiment. Therefore, it is more important to determine the voltage difference at S31.

(Other Embodiments)

(A) The three-phase motor relays M41, M51, M61, M42, M52, M62 may be not positioned between the respective inverters 601, 602 and the respective sets of the three-phase winding 801, 802, which is a different configuration in comparison to the configuration of FIG. 7 or FIG. 20 described above, which includes the three-phase motor relays M41, M51, M61, M42, M52, M62. Such a configuration may be usable based on an assumption that electric power is always supplied to the three-phase motor 800 during the operation of the ECU 10.

(B) The phase difference between the two sets of three-phase winding 801 and 802 is not only 30 [deg], or an angle equivalent to 30 [deg] generalized as (30±60×k) [deg] (k is not limited to an integer). The two sets of three-phase winding 801 and 802 may have the same phase, that is, a phase difference therebetween may be 0 [deg] or (120×k) [deg] (k is an integer).

(C) In the above-described embodiments, for the ease of understanding, the steering lock actuator 710 also functions as a steering wheel vibration actuator. However, in practice, two actuators may generally be implemented as separate motors. Therefore, either one of the steering lock actuator or the steering wheel vibration actuator may be driven by a power converter different from the inverters 601 and 602. Alternatively, one or both of the tilt actuator 720 and the telescopic actuator 730 may be driven by another power converter. In short, one or more and three or less optional DC motors may respectively be connected to a position between one phase of the first set of three-phase winding 801 and one phase of the second set of three-phase winding 802.

(D) The DC motors 710, 720, 730 may respectively be connected not only to positions between corresponding phases of the first set of three-phase winding 801 and the second set of three-phase winding 802, that is, a position between the U1 phase and U2 phase, a position between the V1 phase and V2 phase, and a position between the W1 phase and W2 phase of the first set of three-phase winding 801 and the second set of three phase winding 802, but also to positions between different phases of the winding 801 and winding 802 without redundancy. That is, the DC motors 710, 720, and 730 may respectively be connected to positions between one of U, V, W phases of the first set of three-phase winding 801 and one of U, V, W phases of the second set of three-phase winding 802 without redundancy.

(E) The number of phases of the polyphase rotating machine is not limited to three, but may also be two or may be four or more. That is, the number of phases of the polyphase rotating machine may be generalized as N phases (N is an integer of two or more). One or more, up to N, DC rotating machines can be connected to two sets of N-phase winding of the N-phase rotating machine.

(F) The polyphase rotating machine may "include" two sets of polyphase winding, and may also be configured to include three or more sets of polyphase winding. That is, a DC rotating machine may be connected between (i) one phase of one of any two out of three or more sets of polyphase winding and (ii) one phase of the other of any two out of three or more sets of polyphase winding, without regard to the configuration of other sets of polyphase winding other than the selected two sets out of three or more sets of polyphase winding.

(G) In the above-described embodiments, the upper cut modulation process, the lower cut modulation process, and the center shift process are described as specific examples in which the neutral point voltage of the two sets of three-phase winding 801 and 802 is controlled by the same value. However, it may also be possible to control the neutral point voltage of two sets of three-phase winding 801, 802 by other process.

(H) The practical configuration of the rotating machine controller is not limited to the one illustrated in FIG. 7 and FIG. 20 of the above-described embodiments. For example, the switching element of the inverter may be a field effect transistor other than the MOSFET or an insulated-gate bipolar transistor (IGBT).

(I) The rotating machine controller according to the present disclosure is not only applicable as a controller of a steering assist motor or a reaction force motor and various DC motors, for example, motors for a steering lock operation, a tilt operation, a telescopic operation and the like, but is also applicable as a controller that controls a combination of a polyphase AC motor and a DC motor. Further, the steering assist motor or the reaction force motor may be not only a machine-controller integrated motor, but may also be configured as a machine-controller separate type motor, in which a motor main body and the ECU are connected by a wire harness.

The present disclosure is not limited to such an embodiment described above, but may also be implemented in various forms without departing from the spirit of the disclosure.

The control unit and the method thereof described in the present disclosure may be realized by a dedicated computer provided with a configuration of a processor and a memory, in which a computer program stored in the memory and executed by the processor performs a function or functions provided by the control unit. Alternatively, the control unit and the method thereof described in the present disclosure may be realized by a dedicated computer provided by configuring a processor with one or more dedicated hardware logic circuits. Alternatively, the control unit and the method thereof described in the present disclosure may be realized by a combination of (i) a processor and a memory programmed to perform one or more functions and (ii) a processor configured by one or more hardware logic circuits. The computer program may be stored in a computer readable non-transitory, tangible storage medium as computer-executable instructions.

What is claimed is:

1. A rotating machine controller capable of driving
a polyphase rotating machine including a first set of polyphase windings and a second set of polyphase windings respectively having at least N phases, where N is an integer of two or more, and
a direct current rotating machine is connected between one phase of the first set of polyphase windings and one phase of the second set of polyphase windings, one or more direct current rotating machines connected therebetween being at least one or more up to N, only one of the one or more direct current rotating machines being connected between one phase of the first set of polyphase windings and one phase of the second set of polyphase windings the rotating machine controller comprising:
- (i) a first polyphase power converter and a second polyphase power converter respectively configured to convert a direct current electric power supplied from a direct current power source to a polyphase alternating current electric power by an operation of a plurality of switching elements provided on a high potential side and on a low potential side in bridge connection and applying a voltage to each phase winding of the first set of polyphase windings and to each phase winding of the second set of polyphase windings; and
- (ii) a control unit configured to control a supply of electric power to the polyphase rotating machine and to the direct current rotating machine by controlling an operation of the plurality of switching elements.

2. The rotating machine controller of claim 1, wherein the control unit is configured to adjust an applied voltage to the direct current rotating machine by controlling a neutral point voltage of the first set and the second set of polyphase windings.

3. The rotating machine controller of claim 2, wherein the control unit is configured to control the neutral point voltage of the first set and the second set of polyphase windings by performing an upper shift modulation process that adds, to a voltage instruction of each phase, a difference derived by subtracting, from a preset upper limit value, a maximum voltage instruction among maximum voltage instructions of all phases in the first and second polyphase power converters.

4. The rotating machine controller of claim 2, wherein the control unit is configured to control, the neutral point voltage of the first set and the second set of polyphase winding by performing a lower shift modulation process that adds, to a voltage instruction of each phase, a difference derived by subtracting, from a preset lower limit value, a minimum voltage instruction among minimum voltage instructions of all phases in the first and second polyphase power converters.

5. The rotating machine controller of claim 2, wherein the control unit is configured to control the neutral point voltage of the first set and the Second set of polyphase windings by performing a median shift process that adds, to a voltage instruction of each phase, a difference derived by subtracting, from a preset median value, an average value of maximum voltage instructions and minimum voltage instructions of all phases in the first and second polyphase power converter.

6. The rotating machine controller of claim 2, wherein the control unit is configured to calculate an electric current supplied to the polyphase rotating machine and an electric current supplied to the direct current rotating machine by applying Kirchhoff law to the electric current flowing from the first and second polyphase power converters to the first set and the second set of polyphase windings.

7. The rotating machine controller of claim 1, further comprising:
a direct current rotating machine relay provided at a position between the first and second polyphase power converters and the direct current rotating machine, wherein the control unit is configured to control opening and closing of the direct current rotating machine relay.

8. The rotating machine controller of claim 7, wherein when one of the one or more direct current rotating machines is selected as a specific direct current rotating machine and serves as a target of current supply, and the control unit is configured to adjust an applied voltage to the specific direct current rotating machine by controlling a neutral point voltage of the first set and the second set of polyphase windings, the controlling of the neutral point voltage accompanied by turning OFF of all relays of the direct current rotating machine that are connected to devices other than the specific direct current rotating machine.

9. The rotating machine controller of claim 1, wherein the polyphase rotating machine is a rotating machine for (a) an output of a steering assist torque of an electric power steering system or (b) an output of a reaction torque of a steer-by-wire system.

10. The rotating machine controller of claim 9, wherein the direct current rotating machine includes a tilt actuator or a telescopic actuator of a steering column.

11. The rotating machine controller of claim 9, wherein the control unit is configured to allow a supply of electric power to the direct current rotating machine exclusively when a vehicle speed is less than a vehicle speed threshold.

12. The rotating machine controller of claim 9, wherein the control unit is configured to allow a supply of electric power to the direct current rotating machine exclusively when an absolute value of a steer torque is less than a torque threshold.

13. The rotating machine controller of claim 1, wherein the first and second polyphase power converters and the control unit and the polyphase rotating machine are formed in one body, and
the first and second polyphase power converters and the control unit and the direct current rotating machine are connected through a connector.

14. The rotating machine controller of claim 1, wherein when the control unit supplies electric power to the direct current rotating machine and does not supply electric power to the polyphase rotating machine, the rotating machine controller
(a) turns OFF a switching element on a high potential side in all phases and turns ON a switching element on a low potential side that is connected to the direct current rotating machine selected to apply current in one of the first polyphase power converter and the second polyphase power converter, and (b) turns ON the switching element on a high potential side in all phases and turns OFF the switching element on a low potential side that is connected to the direct current rotating machine selected to apply current in other of the first polyphase power converter and the second polyphase power converter.

15. The rotating machine controller of claim 14 further comprising:
a polyphase rotating machine relay disposed on a phase-specific power path between the first and second polyphase power converters and the first set and the second set of polyphase windings, wherein
the control unit is configured to turn OFF the polyphase rotating machine relay when not supplying electric power to the polyphase rotating machine.

16. The rotating machine controller of claim 1, wherein a number of N phases is three, and the first and second polyphase power converters output alternating currents with phase shift of 30±60×k to the first set and the second set of polyphase windings.

17. The rotating machine controller of claim 1, wherein the control unit is configured to prohibit power supply to the direct current rotating machine when a difference between (i) an input voltage of the first polyphase power converter and (ii) an input voltage of the second polyphase power converter is equal to or greater than a preset value.

18. The rotating machine controller of claim 1, wherein the first and second polyphaser power converters are respectively connected to two independent direct power sources.

19. A rotating machine controller comprising:
   a control unit;
   a first inverter;
   a second inverter;
   a first phase switch;
   a second phase switch;
   a third phase switch;
   a fourth phase switch;
   a fifth phase switch;
   a sixth phase switch;
   an upper first switch; and
   a lower first switch;
   wherein the rotating machine controller is configured to control: (i) a polyphase rotating machine including a first set of windings and a second set of windings, and (ii) a third set of windings;
   wherein the first inverter is configured to receive a first direct current power and to generate a first set of phase voltages for the first set of windings;
   wherein the first set of phase voltages includes: a first phase voltage, a second phase voltage, and a third phase voltage;
   wherein the second inverter is configured to receive a second direct current power and to generate a second set of phase voltages for the second set of windings;
   wherein the second set of phase voltages includes: a fourth phase voltage, a fifth phase voltage, and a sixth phase voltage;
   wherein the first phase switch connects the first phase voltage to a first winding in the first set of windings;
   wherein the second phase switch connects the second phase voltage to a second winding in the first set of windings;
   wherein the third phase switch connects the third phase voltage to a third winding in the first set of windings;
   wherein the fourth phase switch connects the fourth phase voltage to a fourth winding in the second set of windings;
   wherein the fifth phase switch connects the fifth phase voltage to a fifth winding in the second set of windings;
   wherein the sixth phase switch connects the sixth phase voltage to a sixth winding in the second set of windings;
   wherein an upper first direct current switch is configured to connect the first phase voltage to an upper terminal of a seventh winding in the third set of windings; and
   wherein a lower first direct current switch is configured to connect the fourth phase voltage to a lower terminal of the seventh winding in the third set of windings.

20. A rotating machine controller of claim 19, further comprising:
   an upper second switch;
   a lower second switch;
   an upper third switch;
   a lower third switch;
   wherein the upper second switch is configured to connect the second phase voltage to an upper terminal of an eighth winding in the third set of windings;
   wherein the lower second switch is configured to connect the fifth phase voltage to a lower terminal of the eighth winding in the third set of windings;
   wherein the upper third switch is configured to connect the third phase voltage to an upper terminal of a ninth winding in the third set of windings; and
   wherein the lower third switch is configured to connect the sixth phase voltage to a lower terminal of the ninth winding in the third set of windings; and
   wherein the third set of windings includes one of:
      (i) a set of actuators including: a first actuator, a second actuator, and a third actuator, and
      (ii) three windings of an additional polyphase rotating machine.

* * * * *